(12) United States Patent
Tobenkin et al.

(10) Patent No.: US 12,260,686 B1
(45) Date of Patent: Mar. 25, 2025

(54) SYSTEMS AND METHODS FOR VEHICLE DIAGNOSTICS BASED ON MEASURED VIBRATIONS

(71) Applicant: MONLIZ LLC, Sacramento, CA (US)

(72) Inventors: Steven A. Tobenkin, Las Vegas, NV (US); Robert Monaghan, Ventura, CA (US); Lee Lizarraga, Ventura, CA (US)

(73) Assignee: MONLIZ LLC, Sacramento, CA (US)

( * ) Notice: Subject to any disclaimer, the term of this patent is extended or adjusted under 35 U.S.C. 154(b) by 0 days.

(21) Appl. No.: 18/775,056

(22) Filed: Jul. 17, 2024

Related U.S. Application Data

(63) Continuation-in-part of application No. 18/500,772, filed on Nov. 2, 2023, now Pat. No. 12,073,666.

(51) Int. Cl.

| | |
|---|---|
| *G07C 5/08* | (2006.01) |
| *B60W 50/02* | (2012.01) |
| *G01H 9/00* | (2006.01) |
| *G01M 15/12* | (2006.01) |

(52) U.S. Cl.
CPC ....... *G07C 5/0816* (2013.01); *B60W 50/0205* (2013.01); *G01H 9/00* (2013.01); *G01M 15/12* (2013.01); *G07C 5/0808* (2013.01); *B60W 2050/021* (2013.01)

(58) Field of Classification Search
CPC ............... G07C 5/0816; G07C 5/0808; B60W 50/0205; B60W 2050/021; G01H 9/00; G01M 15/12
See application file for complete search history.

(56) References Cited

U.S. PATENT DOCUMENTS

| | | | |
|---|---|---|---|
| 1,710,877 A | 4/1929 | Kaye | |
| 6,684,691 B1 | 2/2004 | Rosseau | |
| 7,237,433 B2 | 7/2007 | Walenty et al. | |
| 11,338,627 B1 | 5/2022 | McGillan | |
| 11,828,732 B1* | 11/2023 | Knas | G07C 5/008 |
| 2003/0110850 A1 | 6/2003 | Saheki | |
| 2015/0046059 A1* | 2/2015 | Kim | G07C 5/00 701/99 |
| 2016/0109331 A1 | 4/2016 | Kato et al. | |

(Continued)

*Primary Examiner* — Harry Y Oh
(74) *Attorney, Agent, or Firm* — Ansari Katiraei LLP; Arman Katiraei; Sadiq Ansari

(57) ABSTRACT

A vehicle monitoring system includes a controller and one or more vibration sensors that measure operational frequencies of different vehicle components during operation of the vehicle. The controller receives the measured operational frequencies and compares them to modeled frequencies for one or more operational states of each of the different vehicle components. The controller determines that the operational frequencies in a particular frequency range associated with a specific component correspond to an abnormal operational state for that specific component in response to the operational frequencies in the particular frequency range deviating from the modeled frequencies for a normal operational state of the specific component or matching the modeled frequencies for the abnormal operational state of the specific component. The controller generates and presents the abnormal operational state of the specific component on one or more of a vehicle console or a user device.

20 Claims, 15 Drawing Sheets

(56) References Cited

U.S. PATENT DOCUMENTS

| | | |
|---|---|---|
| 2017/0350684 A1 | 12/2017 | Maliszewski |
| 2018/0250991 A1 | 9/2018 | Hrabal |
| 2020/0043258 A1* | 2/2020 | Jiang .................... G07C 5/008 |
| 2021/0237896 A1 | 8/2021 | Bill |
| 2022/0339978 A1 | 10/2022 | Schroedel et al. |
| 2023/0306802 A1* | 9/2023 | Karanala ................ G06N 20/00 |
| 2024/0104974 A1* | 3/2024 | Dudar .................... B60C 23/00 |

* cited by examiner

SYSTEMS AND METHODS FOR VEHICLE DIAGNOSTICS BASED ON MEASURED VIBRATIONS

CLAIM OF BENEFIT TO RELATED APPLICATIONS

This application is a continuation-in-part of U.S. nonprovisional application Ser. No. 18/500,772 with the title "SYSTEMS AND METHODS FOR INTEGRATED DIAGNOSTICS OF REAL-TIME DRIVING CHARACTERISTICS", filed Nov. 2, 2023. The contents of application Ser. No. 18/500,772 are hereby incorporated by reference.

BACKGROUND

Vehicles have many sensors to monitor the engine, electronics, and/or other components. These sensors may notify the driver of any components reporting faults or components that may be in need of repair. In other words, the sensors monitor the components and whether the components are operating according to expected parameters. The sensors do not monitor the driving characteristics of the vehicle. For instance, the sensors cannot monitor wheel alignment, other wheel states beyond the tire pressure, and/or other driving characteristics affected by the rotation or orientation of the wheels while the vehicle is in motion.

In addition to not being able to monitor the driving characteristics, each sensor is specialized to detect issues with a particular component. Accordingly, each additional sensor that is needed to monitor a different vehicle component adds cost and complexity to the vehicle.

DETAILED DESCRIPTION OF PREFERRED EMBODIMENTS

Figure 1:
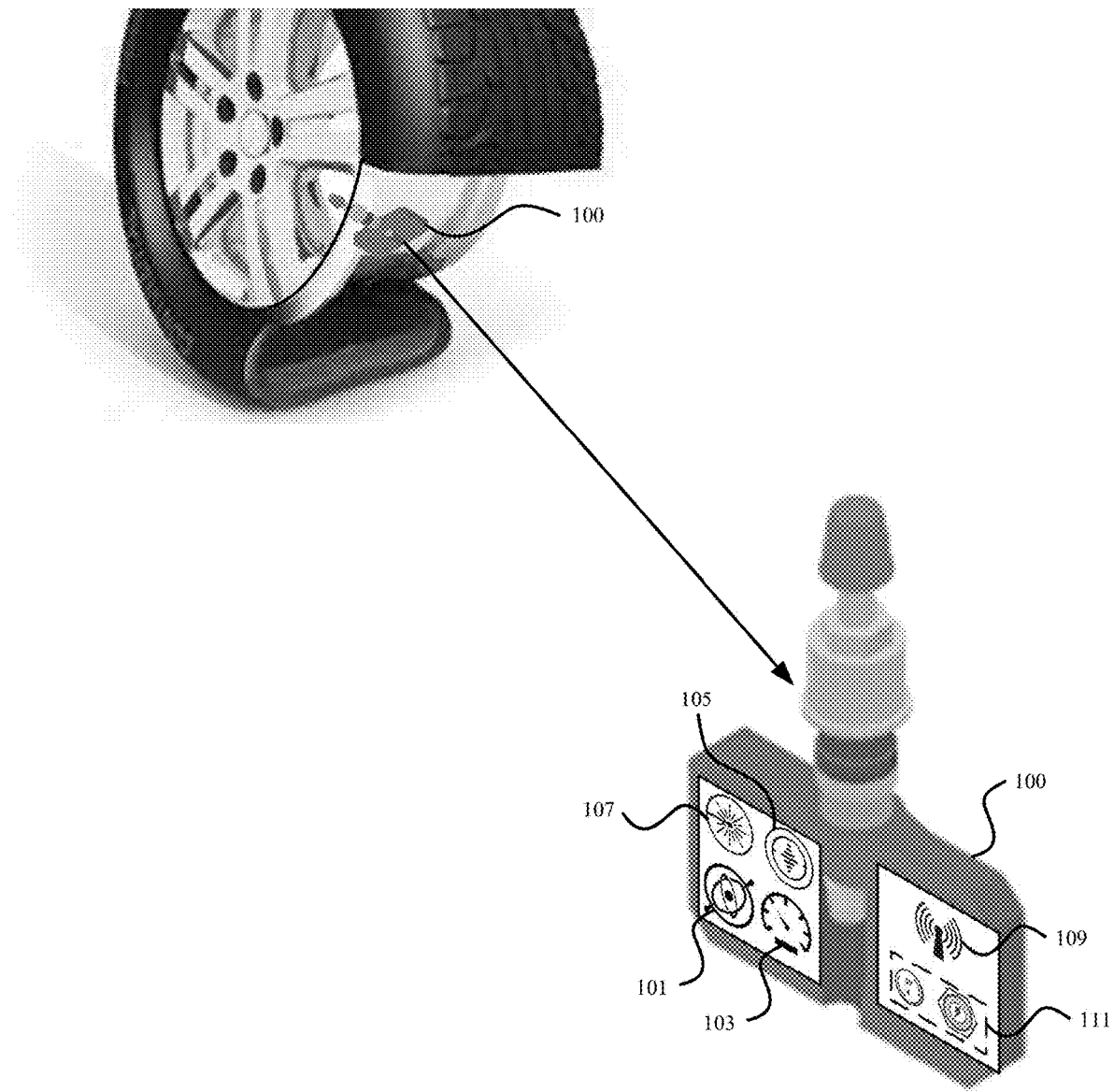
FIG. 1 illustrates an example of a wheel-integrated monitoring device in accordance with some embodiments presented herein.

The following detailed description refers to the accompanying drawings. The same reference numbers in different drawings may identify the same or similar elements.

Provided are systems and methods for integrated diagnostics of real-time driving characteristics and for generating diagnostics based on measured vibrations. The integrated diagnostics are generated from one or more wheel-integrated monitoring devices, vibration sensors, and/or a controller that wirelessly communicates with the one or more wheel-integrated monitoring devices and vibration sensors. The vibration sensors measure harmonics of different vehicle components, and the controller may detect specific issues with different vehicle components by analyzing the measured harmonics and detecting deviations or anomalies in different frequency ranges at which the different vehicle components resonate when the vehicle is in motion or otherwise operational. In some embodiments, the vibration sensors may be integrated as part of the wheel-integrated monitoring device or may be mounted about the vehicle chassis in order to capture the harmonics from different vehicle locations.

In some embodiments, the wheel-integrated monitoring devices are integrated into one or more vehicle wheels and/or are attached to the tire strainer valve (e.g., the valve for filling and ejecting air from the tires that are mounted to the vehicle wheels). The wheel-integrated monitoring devices measure various driving characteristics while the vehicle is in motion, and produce a real-time stream of data as to the measured driving characteristics. For instance, the wheel-integrated monitoring devices measure the arc-of-rotation, orientation, and/or other properties of the vehicle wheels.

The controller may determine the camber, toe, caster, and/or other wheel alignment characteristics associated with each wheel based on the measurements generated by the wheel-integrated monitoring devices. The controller may derive other driving characteristics from the generated measurements including the tire wear state, wheel balance, changes in vehicle traction, changes in gas mileage, and/or other changes affecting the performance of the wheels or vehicle.

In some embodiments, the controller generates alerts that notify the driver of safety issues due to the measured, determined, or derived driving characteristics. For instance, the controller may generate alerts regarding excessive wear on one or more tires or excessive drift that create unsafe driving characteristics.

In some embodiments, the controller may automatically adjust or tune the vehicle driving characteristics based on the generated and determined measurements. The controller automatically adjusts or tunes the vehicle driving characteristics to improve vehicle efficiency and/or performance. For instance, the controller may redistribute power to the wheel motors in order to reduce tire wear and/or improve tire life based on the angle or orientation with which the wheels ride on the road which may be indicative of the load on the wheels.

FIG. 1 illustrates an example of a wheel-integrated monitoring device 100 in accordance with some embodiments presented herein. Wheel-integrated monitoring device 100 is integrated as part of the tire strainer valve. In other words, wheel-integrated monitoring devices 100 may be mounted, attached, or otherwise coupled to the tire strainer valve in a similar fashion as a tire pressure monitoring sensor ("TPMS"). For instance, the tire strainer valve nozzle extends through an opening in the wheel rim with the sensors of wheel-integrated monitoring device 100 being disposed between the rim and the tire that is placed over the rim.

In some embodiments, the TPMS is included as part of wheel-integrated monitoring device 100. In some other embodiments, wheel-integrated monitoring device 100 excludes or replaces the TPMS. Unlike the TPMS which generates a single measurement for a single vehicle component (e.g., the tire pressure), wheel-integrated monitoring device 100 generates multiple measurements for different driving characteristics of the vehicle while the vehicle is in motion. Stated differently, the tire pressure measurement generated by the TPMS relates to a property of the tire and is unrelated to how the vehicle drives (e.g., the vehicle driving characteristics), whereas wheel-integrated monitoring device 100 generates measurements for the rotation, orientation, and/or positioning of the vehicle wheels and tires which directly affect the vehicle driving characteristics.

Wheel-integrated monitoring device 100 includes inertial measurement unit ("IMU") 101, accelerometer 103, gyroscope 105, and/or other sensors 107 and/or integrated circuits for measuring the wheel's arc-of-rotation, acceleration, angular velocity, angle, orientation, height, and position while in motion. For instance, IMU 101 may measure acceleration, orientation, angular rates, and other gravitational forces of a wheel or tire mounted on the wheel. In some embodiments, accelerometer 103 and/or gyroscope 105 control the sampling rate of IMU 101. For instance, accelerometer 103 and/or gyroscope 105 may track the position of wheel-integrated monitoring device 100 relative to the wheel or road (e.g., at the bottom, bottom left, bottom right, top, etc. of the wheel) as the wheel rotates with the vehicle in motion, and may control IMU 101 in taking measurements when IMU 101 or wheel-integrated monitoring device 100 moves to the same set of positions (e.g., bottom left, bottom right, and top) during every wheel rotation. Accordingly, wheel-integrated monitoring device 100 may generate measurements that may be compared to one another, and that may be used to determine different loads on the wheels, calculate wear on the tires, changes in wheel alignment, and/or other driving characteristics.

Wheel-integrated monitoring device 100 also includes transceiver 109 and power unit 111. Transceiver 109 may include a Bluetooth, Bluetooth Low Energy, or other low-power radio for communicating with the controller, transferring data to the controller, and/or receiving commands or configuration data from the controller. In some embodiments, transceiver 109 may be used to directly offload the data from wheel-integrated monitoring device 100 to a user device such as a smartphone, tablet, or other wireless computing device. Power unit 111 may include a battery that continuously or selectively powers wheel-integrated monitoring device 100. For instance, power unit 111 may power accelerometer 103 when the vehicle is not moving, and may power all sensors once accelerometer 103 determines that the vehicle is in motion. In some embodiments, power unit 111 may include a rotational power generator (e.g., magnets) that generate power from the rotation of the vehicle wheel in a quantity that is sufficient to power the sensors and other components of wheel-integrated monitoring device 100 even with the vehicle moving at low speeds (e.g., 2 or more miles per hour).

Wheel-integrated monitoring device 100 may include a protective housing to protect the sensors and other components from environmental elements and/or shocks resulting from the vehicle driving on uneven roads at different various speeds. In some embodiments, the positioning of wheel-integrated monitoring device 100 within the interior of the tire on the tire strainer valve provides sufficient protection from the environmental elements.

In some embodiments, wheel-integrated monitoring device 100 is one or more centimeters in size and is rated to last longer than the expected life of the tire (e.g., over 7 years). In some embodiments, the sensors and other components of wheel-integrated monitoring device 100 are integrated onto a single printed circuit board or wafer to minimize power consumption, size, and potential for damaging the interconnects between the sensors and components.

Figure 2:
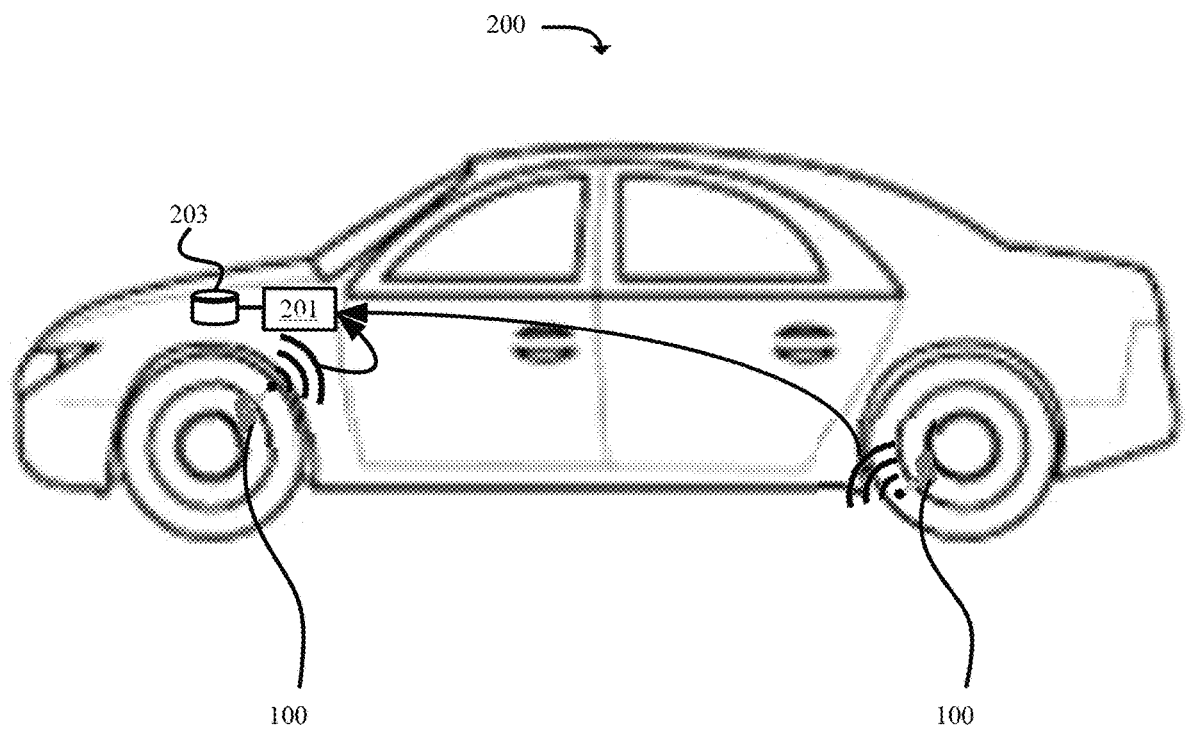
FIG. 2 illustrates an example monitoring system with the wheel-integrated monitoring devices in accordance with some embodiments presented herein.

FIG. 2 illustrates an example monitoring system 200 using wheel-integrated monitoring devices 100 in accordance with some embodiments presented herein. Example monitoring system 200 includes controller 201, non-volatile storage medium 203, and wheel-integrated monitoring devices 100.

Wheel-integrated monitoring devices 100 are integrated into each wheel, and wirelessly communicate with controller 201. Controller 201 may include one or more hardware processors and a transceiver that receive power when the vehicle is turned on. Controller 201 may be part of the vehicle's on-board electronic control unit ("ECU") or may be an after-market component that is separate from the ECU and/or that is added to the vehicle after assembly.

Controller 201 may pair with or establish a secure session with each wheel-integrated monitoring device 100 in order to receive diagnostic data or measurements from each wheel-integrated monitoring device 100 via its own transceiver. Each wheel-integrated monitoring device 100 may be configured with a different unique identifier and may provide that unique identifier with the data it sends to controller 201. Controller 201 may differentiate the data that is received for each wheel based on the unique identifier accompanying the data.

Controller 201 processes the data from each wheel-integrated monitoring device 100 to derive the driving characteristics of the vehicle. For instance, controller 201 may determine the wheel alignment based on caster, toe, and/or camber measurements that are derived from the wheel-integrated monitoring device 100 data. Controller 201 may determine wear on each tire from the wheel-integrated monitoring device 100 data. For instance, controller 201 may determine the average load on the wheels (e.g., number of passengers or overall weight), average acceleration, average velocity, and/or other driving characteristics based on the received wheel-integrated monitoring device 100 data and changes to that data over time.

Controller 201 may store the received wheel-integrated monitoring device 100 data and/or derived driving characteristics to non-volatile storage medium 203. Non-volatile storage medium 203 may store the received data and/or derived driving characteristics over the lifetime of the tires or vehicle. The data stored by non-volatile storage medium 203 may be downloaded onto a third-party device. For instance, a mechanic may download the data off non-volatile storage medium 203 to view the measured driving characteristics and determine adjustments to the vehicle that correct wheel misalignment, improve the driving characteristics, improve tire life, and/or improve vehicle efficiency or performance. Moreover, the vehicle manufacturer may receive data streams from the vehicles it manufactures that are equipped with wheel-integrated monitoring devices 100 and/or monitoring system 200, and may analyze those data streams to improve their vehicles.

In some embodiments, controller 201 may dynamically generate adjusted alignment specifications for the vehicle based on the derived average load, acceleration, speed, and/or other driving characteristics of the vehicle, and may output the adjusted alignment specifications to a mechanic performing the wheel alignment. For instance, the manufacturer defined alignment specifications may be based on the vehicle being weighted with a single driver and a full tank of gas. Controller 201 may adjust the manufacturer defined alignment specifications in response to determining, based on the angle, orientation, positioning, and/or other wheel data measured by wheel-integrated monitoring devices 100, that the vehicle is typically loaded more than the manufacturer defined alignment specifications, and that an increase or decrease in the wheel camber, toe, or caster may lead to longer tire life, better traction, improved gas mileage or efficiency, and/or improved performance.

In some embodiments, controller 201 may communicate with the vehicle EDC or safety system, and may generate alerts via lights on the dashboard or indicators on the vehicle console when the determined driving characteristics are outside acceptable tolerances or thresholds. For instance, controller 201 may determine that the wheel alignment is outside of manufacturer specifications by a threshold amount, and may generate an alert on the vehicle dashboard or console or on an application running on the driver device (e.g., driver's smartphone) that the vehicle tire may experience premature or excessive wear as a result of the wheel misalignment or that the wheel require alignment. Additionally, controller 201 may monitor the angle or position of the wheels relative to the road over time, may determine remaining tread life of the tires based on changes to the angle or positions of the wheels, and may generate an alert or reminder that one or more of the tires is excessively worn, has become unsafe, and/or is due for replacement.

In some embodiments, controller 201 is integrated with the vehicle drive system, and directly adjusts vehicle performance based on the determined driving characteristics. For instance, controller 201 may adjust the torque response and/or power distribution to different wheels when determining that the vehicle is loaded more or less than normal, when one or more wheels are out of alignment, and/or as the tires wear and lose traction. In so doing, controller 201 may improve gas mileage, tread life, efficiency, and/or performance of the vehicle dynamically over the life of the tires and in response to different detected conditions affecting the driving characteristics of the vehicle.

Figure 3:
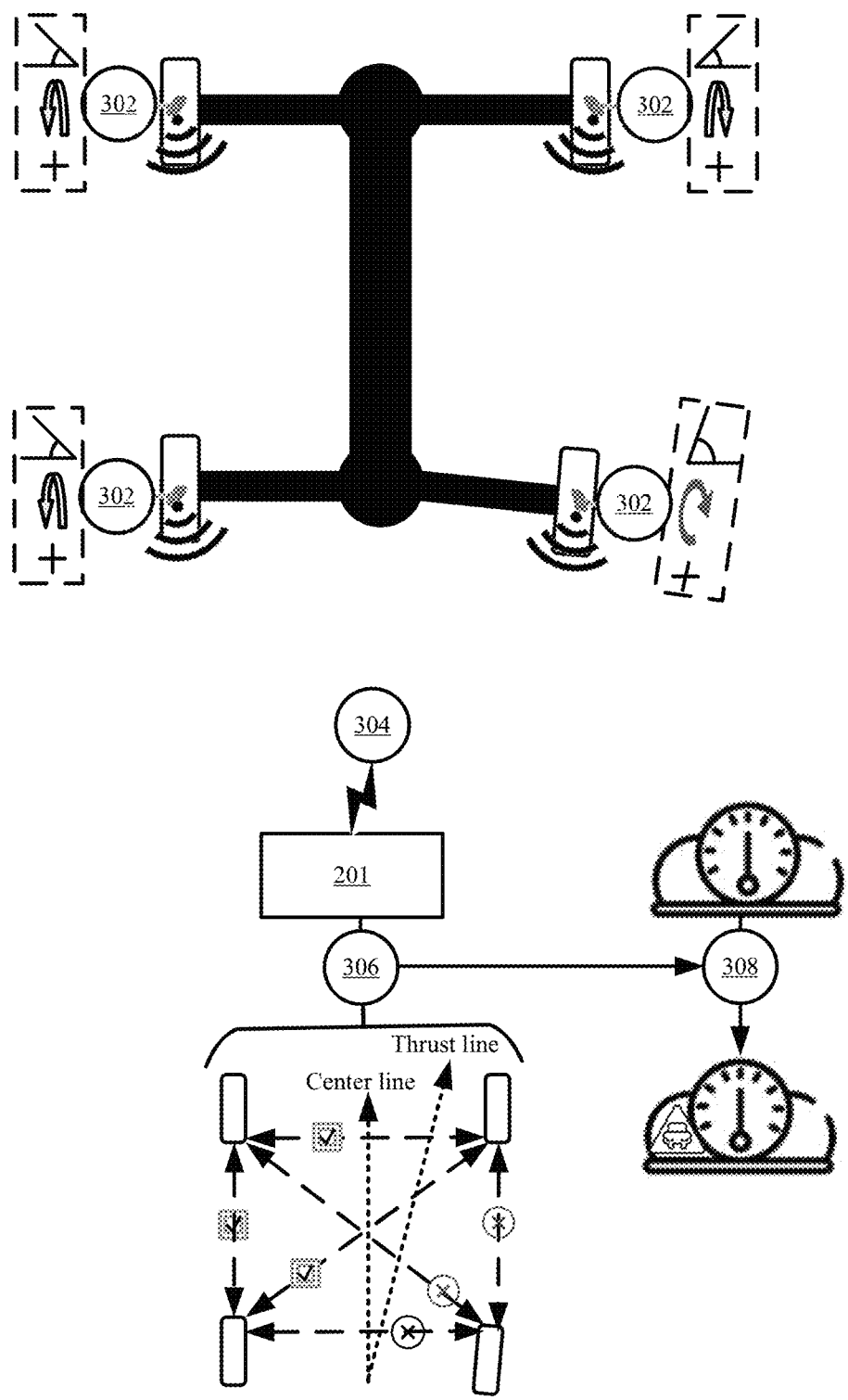
FIG. 3 illustrates example measurements for driving characteristics of a vehicle that are generated by the wheel-integrated monitoring devices in accordance with some embodiments presented herein.

FIG. 3 illustrates example measurements for driving characteristics of a vehicle that are generated by wheel-integrated monitoring devices 100 in accordance with some embodiments presented herein. Wheel-integrated monitoring device 100 is integrated in each vehicle wheel. As the vehicle is in motion (e.g., being driven), wheel-integrated monitoring devices 100 measure (at 302) the wheel's arc-of-rotation, angle, orientation, and/or position at the same points along each wheel rotation.

Each wheel-integrated monitoring device 100 wirelessly transmits the measurements to controller 201. Controller 201 receives (at 304) the measurements from each wheel-integrated monitoring device 100.

Controller 201 compares and/or analyzes the measurements to determine (at 306) anomalous driving characteristics. Controller 201 may determine (at 306) the anomalous driving characteristics by comparing the measurements from each wheel to one another, and detecting one or more measurements of one or more wheels that deviate from the measurements of other wheels by more than a threshold amount. For instance, controller 201 detects a misaligned wheel in response to the arc-of-rotation, angle, orientation, and/or position of a wheel being offset from the vehicle center line. The misaligned or offset wheel may be due to unseen structural damage to the vehicle after an accident or due to the wheel losing alignment as a result of normal driving and/or coming into contact with different bumps or road imperfections. Controller 201 may also determine (at 306) the anomalous driving characteristics by detecting one or more measurements from one or more wheels that are outside of manufacturer or vehicle specifications or acceptable tolerances. Controller 201 may be configured with the manufacturer or vehicle specifications or acceptable tolerances when it is installed on the vehicle. For instance, the installer may wirelessly connect to controller 201 with a user device, may specify the make and model of the vehicle, and the user device may download and install the manufacturer or vehicle specifications or acceptable tolerances into non-volatile storage medium 203 or a storage of controller 201.

The misaligned wheel may make the vehicle unsafe to drive, may cause the vehicle to lose performance (e.g., increased fuel consumption, cause drift, etc.), may increase tread wear on the tires, and/or may change other driving characteristics of the vehicle. Accordingly, controller 201 may generate (at 308) an alert on the vehicle dashboard or console to notify the driver of the issue. For instance, controller 201 may activate a check engine light that indicates one or more of the wheels being misaligned. The driver may then take the vehicle to a repair shop for inspection or repair.

Figure 4:
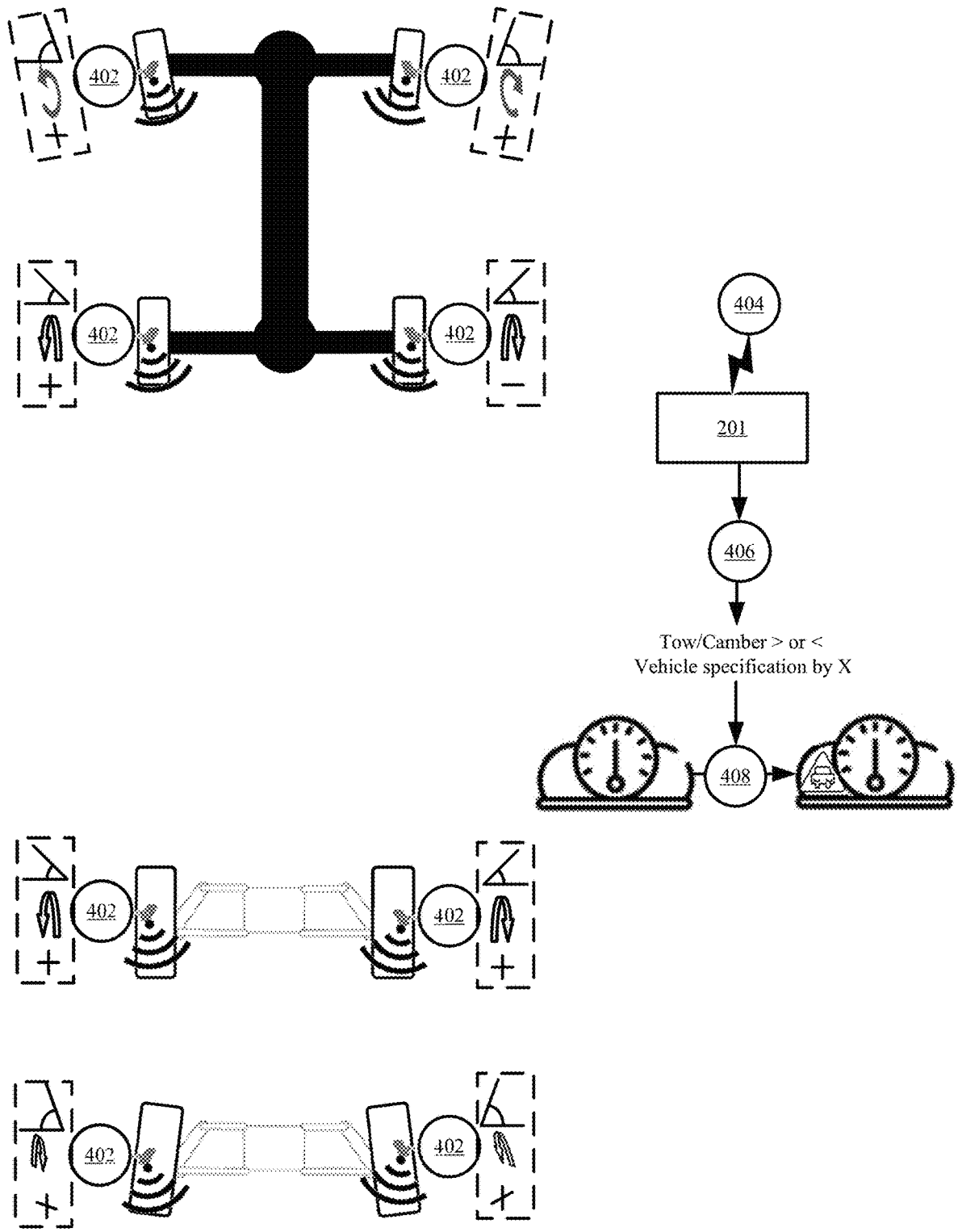
FIG. 4 illustrates examples of different deviating driving characteristics that are detected from the wheel-integrated monitoring devices measurements in accordance with some embodiments presented herein.

FIG. 4 illustrates examples of different deviating driving characteristics that are detected from the wheel-integrated monitoring devices 100 measurements in accordance with some embodiments presented herein. Wheel-integrated monitoring devices 100 measure (at 402) each wheel's arc-of-rotation, angle, orientation, and/or position at the same points along each wheel rotation, and transmit the measurements to controller 201.

Controller 201 receives (at 404) the measurements from each wheel-integrated monitoring device 100. Controller 201 compares and/or analyzes the measurements to determine (at 406) driving characteristics that are outside of manufacturer or vehicle specifications or acceptable tolerances. For instance, the arc-of-rotation, angle, orientation, and/or position of a wheel may have an inward or outward positioning that deviates by more than a threshold amount from the manufacturer or vehicle specified amount of wheel toe. Similarly, controller 201 also detects a misaligned wheel based on the arc-of-rotation, angle, orientation, and/or position of a wheel indicating that the angle or tilt of the wheel deviates by more than a threshold amount from the manufacturer or vehicle specified amount of wheel camber. In some embodiments, controller 201 also detects a misaligned wheel based on the arc-of-rotation, angle, orientation, and/or position of a wheel indicating that the wheel does not return to center or a straight position after a turn, and therefore has a caster that deviates by more than a threshold amount from the manufacturer or vehicle specified amount of caster.

Here again, the misaligned wheel may make the vehicle unsafe to drive, may cause the vehicle to lose performance (e.g., increased fuel consumption, cause drift, etc.), may increase tread wear on the tires, and/or may change other driving characteristics of the vehicle. Accordingly, controller 201 may generate (at 408) an alert on the vehicle dashboard or console to notify the driver of the issue.

The measurements received from wheel-integrated monitoring devices 100 while the vehicle is in motion provide a more accurate assessment of the wheel alignment than existing techniques that measure the wheel alignment while the vehicle is stationary or suspended on a lift. When suspended on a lift, there is no load on the wheels, and the load has an effect on the suspension connecting the wheels to the vehicle. Therefore, performing an alignment based on measurements taken from a stationary vehicle (e.g., a vehicle suspended on a lift) may yield different results than performing an alignment based on measurements taken while the vehicle is in motion with actual passenger loads distributed across the vehicle.

In some embodiments, controller 201 compares and/or analyzes the received measurements from a particular wheel-integrated monitoring device 100 to recorded measurements previously generated by that particular wheel-integrated monitoring device 100 in order to determine driving characteristics associated with the tire tread. Low tire tread is an issue that some drivers are unaware of. For instance, if a vehicle is running without issue, then the driver may feel there is no need to take the vehicle to a mechanic for inspection and the low tire tread may go unnoticed until it is too late. Similarly, a mechanic may perform one repair (e.g., an oil change) and not diagnose other potential issues such as low tire tread. Being unaware of low tire tread may also be caused by tires having a wide range of expected tread life (e.g., from 20,000 miles to 75,000 miles). Accordingly, some drivers expect their tires to last longer than warranted by the manufacturer. The driving behavior of the driver as well as a poorly maintained vehicle (e.g., wheels that are out of alignment) may contribute to premature or excessive wear on the tires. Accordingly, controller 201 may use the data from wheel-integrated monitoring devices 100 to notify the driver when it is time to replace the tires and/or other safety issues related to the vehicle wheels and tires.

Figure 5:
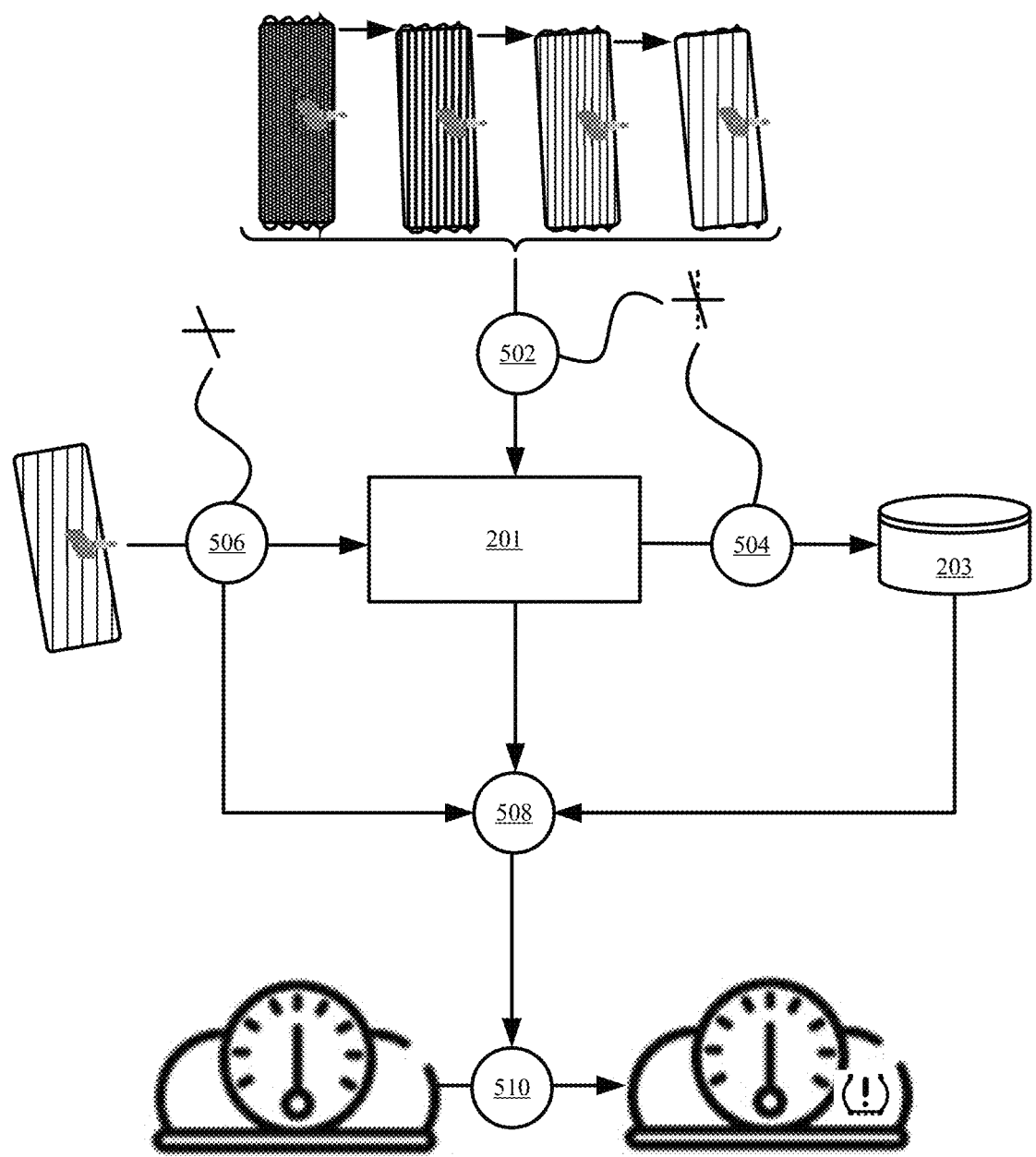
FIG. 5 illustrates an example of monitoring tire tread based on measurements from a wheel-integrated monitoring device in accordance with some embodiments presented herein.

FIG. 5 illustrates an example of monitoring tire tread based on measurements from wheel-integrated monitoring device 100 in accordance with some embodiments presented herein. Controller 201 receives (at 502) measurements generated by sensors of a specific wheel-integrated monitoring device 100 over time, and stores (at 504) the measurements to non-volatile storage medium 203. Controller 201 also receives (at 506) current measurements generated by sensors of the specific wheel-integrated monitoring device 100, and compares (at 508) the current measurements to the stored measurement to detect changes in one or more of the measurements. For instance, controller 201 may determine that the angle, height, or position of the wheel changes over time, and the amount of change may correspond to an amount of tire wear. Similarly, controller 201 may measure the vehicle drifting in one direction based on the received (at 502 and 506) measurements, and may determine that the amount of drift correlates to an amount of wear on the tire. In some embodiments, controller 201 may determine the remaining tire tread based on changes in the traction of the tires. For instance, gas mileage of the vehicle may decrease or additional rotations of the tire may be needed to travel a particular distance (e.g., acceleration of the vehicle changing for the same number of wheel rotations). Wheel-integrated monitoring device 100 may measure these changes, and controller 201 may compute changes in the tire tread based on the measured changes.

In response to determining that the tire tread is worn past a safe amount, controller 201 generates (at 510) a warning on the vehicle dashboard or console to notify the driver of condition. Specifically, controller 201 may activate a low tread warning light or indicator on the dashboard or vehicle console. The driver or a mechanic may measure the tire tread themselves and deactivate the warning light or indicator if the remaining tread is within acceptable limits, or may replace the tires to reset the warning light or indicator.

The measured driving characteristics from which the various warnings or alerts are generated may be stored in non-volatile storage medium 203 and/or may be wirelessly downloaded from monitoring system 200 to a device of a mechanic so that the mechanic may immediately identify and remedy the issue. Specifically, the mechanic may download the driving characteristics and may immediately perform adjustments to various vehicle components without having to manually diagnose and/or recreate the issues.

Figure 6:
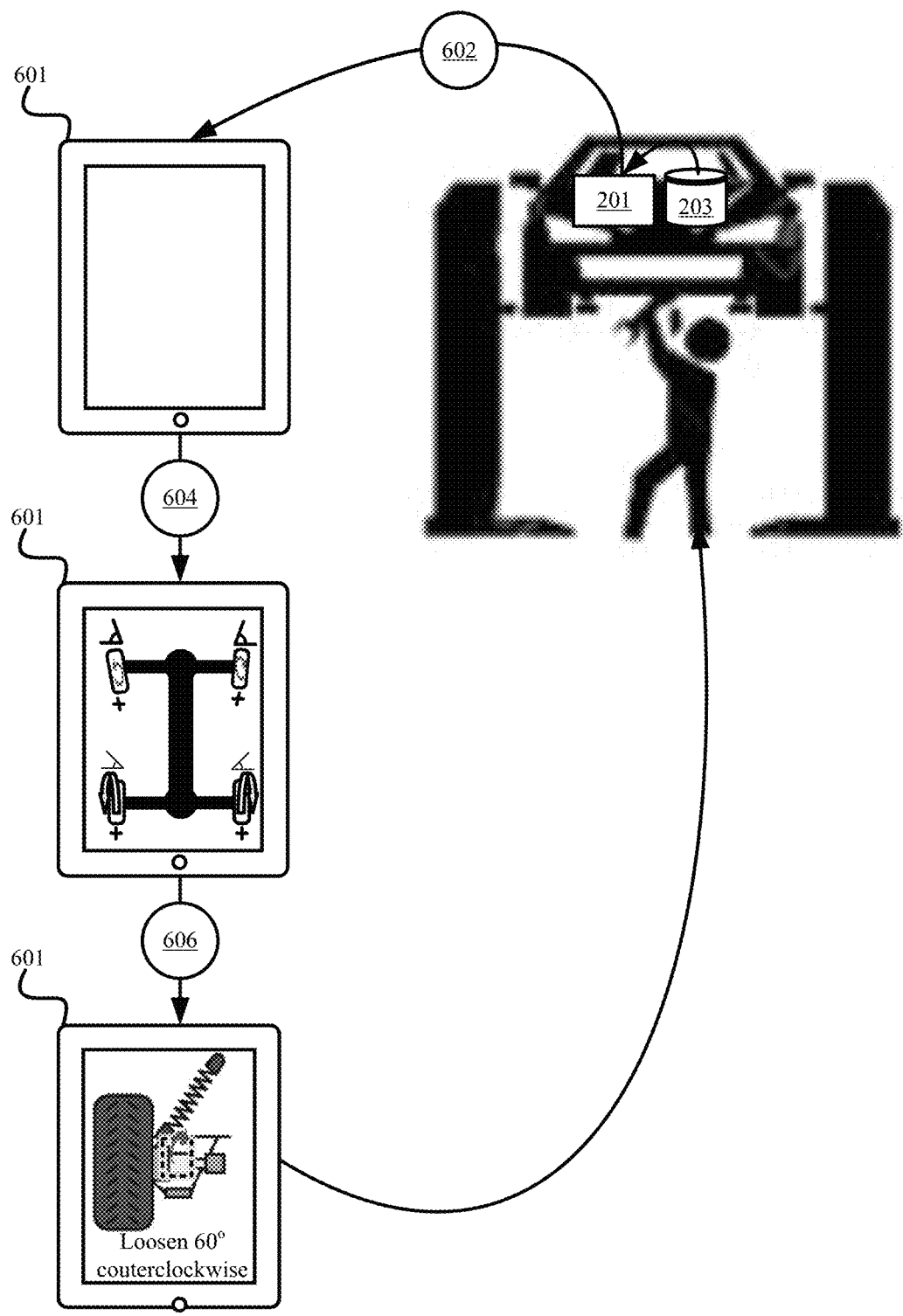
FIG. 6 illustrates an example of tuning a vehicle based on the driving characteristics measurements that are derived from or generated from the wheel-integrated monitoring devices in accordance with some embodiments presented herein.

FIG. 6 illustrates an example of tuning a vehicle based on the driving characteristics measurements that are derived from or generated from wheel-integrated monitoring devices 100 in accordance with some embodiments presented herein. The measurements generated by wheel-integrated monitoring devices 100 and/or the derived driving characteristics produced by controller 201 from the generated measurements may be downloaded (at 602) to user device 601. User device 601 may include a network-enabled computing device such as a tablet, smartphone, laptop computer, desktop computer, or headset. User device 601 may establish a wireless connection with controller 201, request the stored measurements and/or driving characteristics from non-volatile storage medium 203, and download (at 602) the stored measurements and/or driving characteristics over the established wireless connection.

User device 601 may generate (at 604) a visualization to illustrate the driving characteristics. For instance, user device 601 may present a visualization for the measured wheel's arc-of-rotation, angle, orientation, and position of each wheel, or may present deviations between manufacturer or vehicle defined specifications or accepted tolerances and the downloaded measurements or driving characteristics. In some embodiments, user device 601 may also receive diagnostics that are generated by diagnostic equipment at the mechanic shop while the vehicle is stationary.

User device may compare the measurements from each wheel-integrated monitoring device 100 to the diagnostics taken while the vehicle is stationary, and generating (at 604) the visualization may include illustrating the differences in driving characteristics resulting from the actual driving conditions and from the diagnostic equipment at the mechanic shop.

User device 601 may also present (at 606) adjustments to specific vehicle components for restoring the driving characteristics to the manufacturer or vehicle defined specifications or acceptable tolerances. Controller 201 may define the adjustments from the generated measurements and/or driving characteristics. Alternatively, user device 601 may execute an application that determines wheel alignment or other issues based on the downloaded (at 602) data, and generates the adjustments based on manufacturer or vehicle repair guidelines.

In some embodiments, user device 601 may include a virtual reality, mixed reality, augmented reality, or other spatial computing device that overlays the visualization of the measurements onto actual images of each vehicle wheel or that overlays the adjustments onto the actual vehicle components. This allows the user to visualize the issues while working on the vehicle.

Controller 201 may dynamically define adjustments for each vehicle according to optimizations that controller 201 may make or apply to manufacturer or vehicle recommended specifications or acceptable tolerances based on the wheel-integrated monitoring device 100 generated measurements and/or determined driving characteristics. In other words, controller 201 May dynamically define the adjustments to tune the driving characteristics to slightly differ from the manufacturer or vehicle recommended specifications or acceptable tolerances. This is because the manufacturer or vehicle recommended specifications or acceptable tolerances are often optimized for a single driver load, new tires (e.g., full tread), and normal driving behavior. However, the measurements generated by wheel-integrated monitoring devices 100 may indicate different loads on the vehicle, different tire conditions, and/or different driving behaviors. Controller 201 may account for these differences when defining the adjustments to the vehicle driving characteristics so that the vehicle performance (e.g., traction, fuel efficiency, etc.) improves and/or tire wear is reduced relative to tuning the driving characteristics solely based on the manufacturer or vehicle recommended specifications or acceptable tolerances.

Stated differently, since the driving characteristics are measured under actual driving loads and conditions, controller 201 may dynamically determine the vehicle adjustments for correcting wheel alignment and/or other driving characteristic deviations rather than have the mechanic set the wheel alignment and/or other driving characteristics for all vehicles of the same make and model exactly to the manufacturer or vehicle specifications. The dynamic wheel alignment may compensate for different amounts of wear on the tires of each vehicle, for different average loads on each vehicle, and/or for different driver behavior associated with vehicle. For instance, deviating from the manufacturer or vehicle specified camber, caster, or toe in response to the different tire wear, average loads, and/or different driver behavior may reduce wear on the tire, improve gas mileage, provide better traction and/or performance, and/or improve other driving characteristics of the vehicle than if the wheels were aligned exactly to the manufacturer or vehicle specified camber, caster, or toe.

Figure 7:
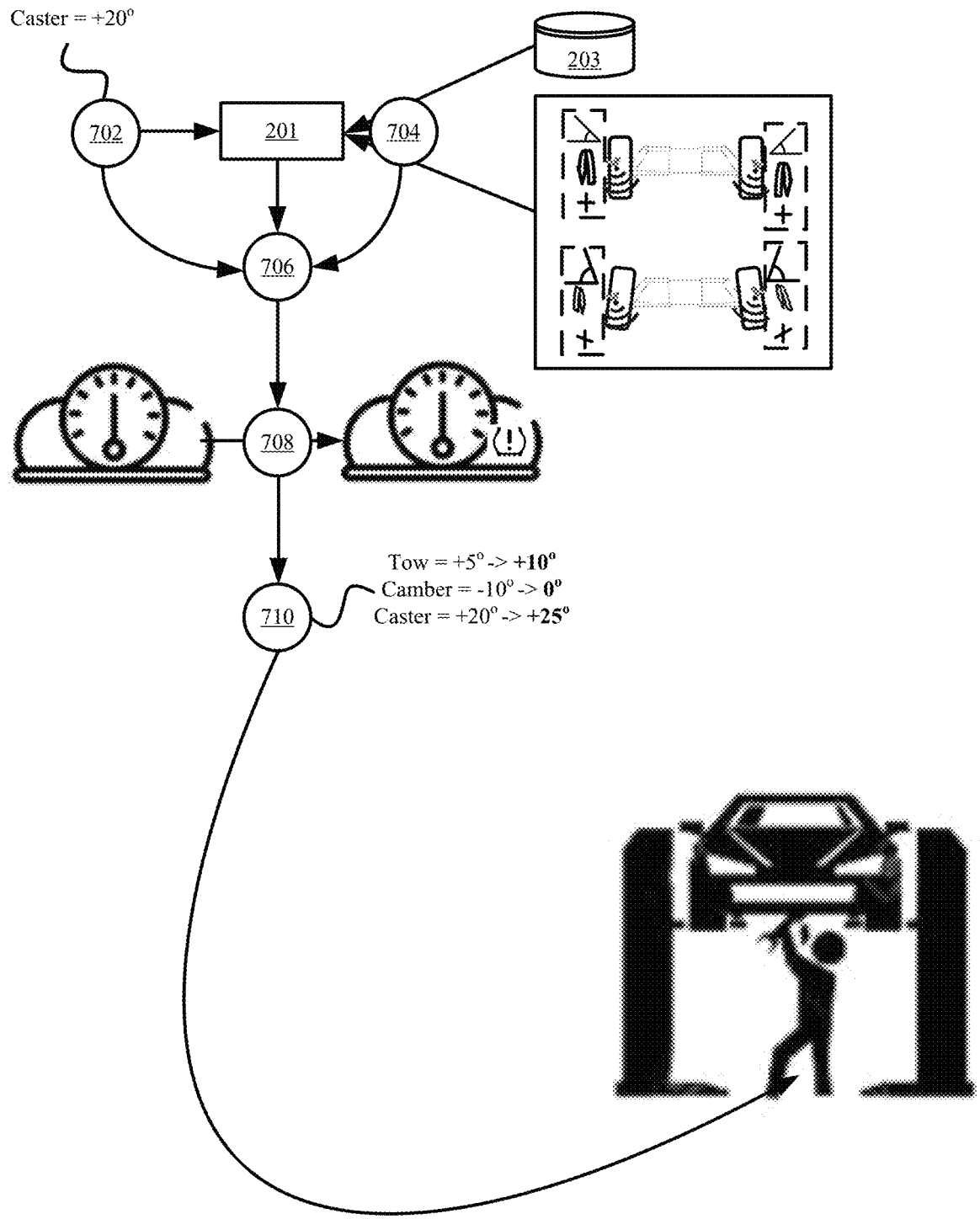
FIG. 7 illustrates an example of dynamic wheel alignment that is defined based on measurements of the wheel-integrated monitoring devices in accordance with some embodiments presented herein.

FIG. 7 illustrates an example of dynamic wheel alignment that is defined based on measurements of wheel-integrated monitoring devices 100 in accordance with some embodiments presented herein. Controller 201 is configured (at 702) with manufacturer or vehicle specifications for wheel alignment for the vehicle make and model on which controller 201 is installed. For instance, the manufacturer may specify a specific amount of toe, camber, and caster for the wheels of every vehicle of that make and model it manufacturers.

Controller 201 receives (at 704) the driving characteristics of the vehicle from wheel-integrated monitoring devices 100. More specifically, controller 201 receives (at 704) the current driving characteristics and past driving characteristics measured by wheel-integrated monitoring device 100.

Controller 201 compares (at 706) the driving characteristics of the vehicle that are measured by wheel-integrated monitoring devices 100 to the manufacturer or vehicle specifications, and determines that the vehicle is in need of alignment in response to the driving characteristics deviate from the manufacturer or vehicle specifications by more than a threshold amount. Controller 201 generates (at 708) an alert to notify the driver that the wheels are out of alignment.

Controller 201 computes (at 710) custom values for the camber, caster, and toe of the vehicle based on the manufacturer or vehicle specifications as modified for the vehicle's tracked driving characteristics. The tracked driving characteristics include the current measurements generated by wheel-integrated monitoring devices 100 and historical measurements stored in non-volatile storage medium 203.

In some embodiments, controller 201 computes (at 710) the custom values by accounting for tread wear on the tires, average load with which the vehicle is driven, and driving behavior of the user. The tread wear, average load, and driving behavior are driving characteristics that may be measured or derived based on the data collected and reported by wheel-integrated monitoring devices 100. For instance, the tread wear may be measured based on the changing height, angle, tilt, orientation, and/or position of the wheels over time. More specifically, tires may experience more wear along the inner or proximal tread and less wear along the outer or distal tread. Alternatively, the height of the tire may be reduced by one or more millimeters as the tire tread is worn. The average load may also be measured based on the changing height, angle, tilt, orientation, and/or position of the wheels when the vehicle is driven with different loads. For instance, the wheel camber may change based on the vehicle weight. Also, the inner tread of the tires or the entirety of the tires may wear at a faster rate when the vehicle is more heavily loaded. The driving behavior may be measured based on how fast the vehicle accelerates and/or travels on average. These measurements may be derived from the accelerometer and/or the speed by which the wheel rotations change over time.

In some embodiments, the custom values computed (at 710) by controller 201 may be based on the manufacturer or vehicle specifications corresponding to an optimal wheel alignment when the vehicle has a particular load (e.g., one average weight driver and the vehicle having a full tank of gas) and the tires are new (e.g., no wear on the tire tread). Controller may adjust (e.g., increase or decrease) one or more of the manufacturer or vehicle specified camber, caster, or toe values based on a deviation between the actual measured load and the load used in the manufacturer or vehicle specifications and/or based on a deviation between computed remaining tire tread and new tires with no tread.

In some other embodiments, controller 201 computes (at 710) the custom values for the wheel alignment directly from the determined driving characteristics of vehicle load and tire wear. For instance, controller 201 may specify a positive camber and a toe out for the alignment when the measurements indicate greater wear on the inner tread of the tire than the outer tread of the tire or when the vehicle is more heavily loaded on average.

Similarly, the driving behavior may be considered when computing (at 710) the custom values for the wheel alignment. For instance, an aggressive driver that accelerates quickly and drives at high speeds may require better traction at the expense of faster tire wear. Accordingly, controller 201 may specify a negative camber and positive caster for the aggressive driver, and may specify a neutral or positive camber and neutral or less positive caster for a less aggressive driver, wherein the positive camber and neutral or less positive caster may reduce tire wear and improve gas mileage for the less aggressive driver while providing an acceptable amount of traction.

In any case, controller 201 dynamically generates or adjusts wheel alignment values for each vehicle of the same make and model to optimize the wheel alignment and driving characteristics of each vehicle based on the load, tire wear, and/or driving behavior that wheel-integrated monitoring devices 100 track for that vehicle. The custom values ensures that a one-size-fits-all alignment is not performed for every vehicle of the same make and model, and that the wheel alignment is dynamically customized for each vehicle based on its unique driving characteristics at the time of alignment.

In some embodiments, controller 201 is linked to the drive control system of the vehicle, and may dynamically adjust vehicle performance. More specifically, controller 201 may control the drive motors or power distribution to the wheels in order to reduce tire wear, improve fuel efficiency, improve traction, and/or otherwise optimize the vehicle performance based on the measured driving characteristics.

Figure 8:
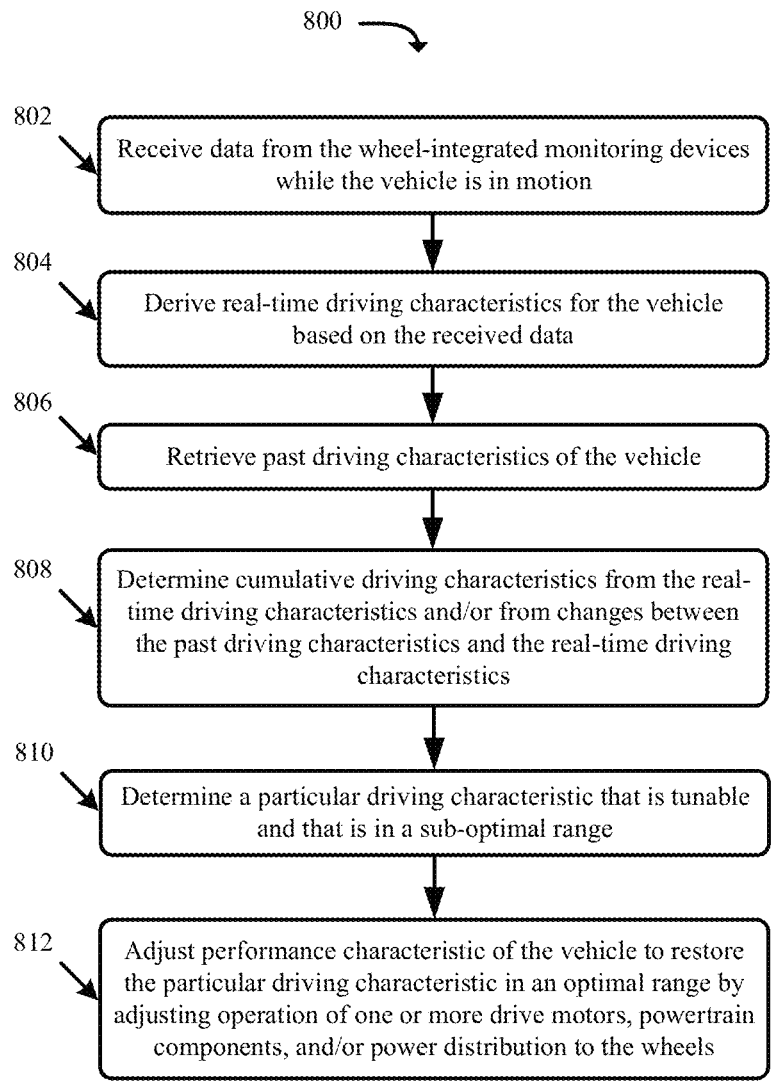
FIG. 8 presents a process for dynamically controlling vehicle performance based on the monitoring of the vehicle driving characteristics in accordance with some embodiments presented herein.

FIG. 8 presents a process 800 for dynamically controlling vehicle performance based on the monitoring of the vehicle driving characteristics in accordance with some embodiments presented herein. Process 800 is implemented by combined operation of controller 201 and wheel-integrated monitoring devices 100 and by integrating controller 201 as part of the drive control system of the vehicle that control the drive motors, power distribution to the wheels, steering performance (e.g., drive-by-wire steering systems), and other drivetrain components.

Process 800 includes receiving (at 802) data from wheel-integrated monitoring devices 100 while the vehicle is in motion. The data includes measurements for the arc-of-rotation, angle, orientation, position, and/or other properties of each wheel. The data is received by controller 201 over a wireless Bluetooth connection.

Process 800 includes deriving (at 804) real-time driving characteristics for the vehicle based on the received (at 802) data from wheel-integrated monitoring devices 100. The real-time driving characteristics may include measurements for the current load on the vehicle, wear pattern on the tires, the current positioning, tilt, and/or orientation of the wheels to the ground or road, and/or tire traction.

Process 800 includes retrieving (at 806) past driving characteristics of the vehicle. The past driving characteristics are stored to the non-volatile storage medium 203, and may loaded into the memory of controller 201 along with the real-time driving characteristics.

Process 800 includes determining (at 808) cumulative driving characteristics from the real-time driving characteristics and/or from changes between the past driving characteristics and the real-time driving characteristics. For instance, some driving characteristics, such as tire tread wear, may require a point of reference that is established using the past driving characteristics, and are computed based on changes from that point of reference. Other driving characteristics, such as the average load of the vehicle, are determined from multiple measurements taken for that driving characteristics over a period of time rather than a single measurement.

Process 800 includes determining (at 810) a particular driving characteristic that is tunable and that is in a sub-optimal range. A tunable driving characteristic is one that may be dynamically adjusted by modifying operation or control of the vehicle drive motors and/or other drivetrain components. In some embodiments, the sub-optimal range is determined from manufacturer or vehicle defined specifications or acceptable tolerances. The particular driving characteristic may be in the sub-optimal range when it differs from the manufacturer or vehicle defined specifications or acceptable tolerances by more than a threshold amount. In some embodiments, the sub-optimal range is determined based on the particular driving characteristic changing by more than a threshold amount from a point of reference established for that particular driving characteristic or an optimal value. For instance, controller 201 may determine that the tire tread has worn past a particular amount.

Process 800 include adjusting (at 812) performance characteristic of the vehicle to restore the particular driving characteristic in an optimal range. Adjusting (at 812) the performance characteristic may include adjusting operation of one or more drive motors, powertrain components, and/or power distribution to the wheels. For example, controller 201 may determine that the tires have excessive wear and that traction is reduced as a result. Accordingly, controller 201 may reduce the throttle or torque response of the vehicle when the accelerator is pressed to prevent the wheels from slipping. As another example, controller 201 may provide more power to the rear wheels than the front wheels in response to detecting that the vehicle is overloaded with the additional power to the rear wheels reducing tire tread wear on the front the wheels, thereby prolonging the tire life.

In some embodiments, monitoring system 200 includes one or more vibration sensors for measuring the frequencies at which different vehicle component resonate when the vehicle is in motion or is operational. The vibration sensors may be incorporated in each wheel-integrated monitoring device 100 and/or may located elsewhere on the vehicle to measure the vehicle component sounds and frequencies from locations other than the wheels or tire that may be better isolated from road noise, wheel noise, and/or other noises.

The vibration sensors are sensors that monitor multiple different vehicle components and may be used to eliminate or replace may of the specialized vehicle sensors that monitor only a single component and/or a single aspect of the component. For instance, the engine, struts, shocks, axels, transmission, brakes, tires, and other vehicle components are manufactured with different materials and function differently (e.g., involve combustion, compress and expand, rotate at different speeds, etc.). Accordingly, each of these components may produce different harmonics in different frequency ranges when the component is operational or when the vehicle is in motion. The vibration sensors May capture and measure these harmonics across the different frequency ranges. By determining, isolating, modeling, and/or analyzing the harmonics and/or frequency ranges of the different vehicle components, monitoring system 200 may detect faults, issues, and/or preemptive failures associated with each of the different vehicle components using only the vibration sensors and the vibrational analysis.

Figure 9:
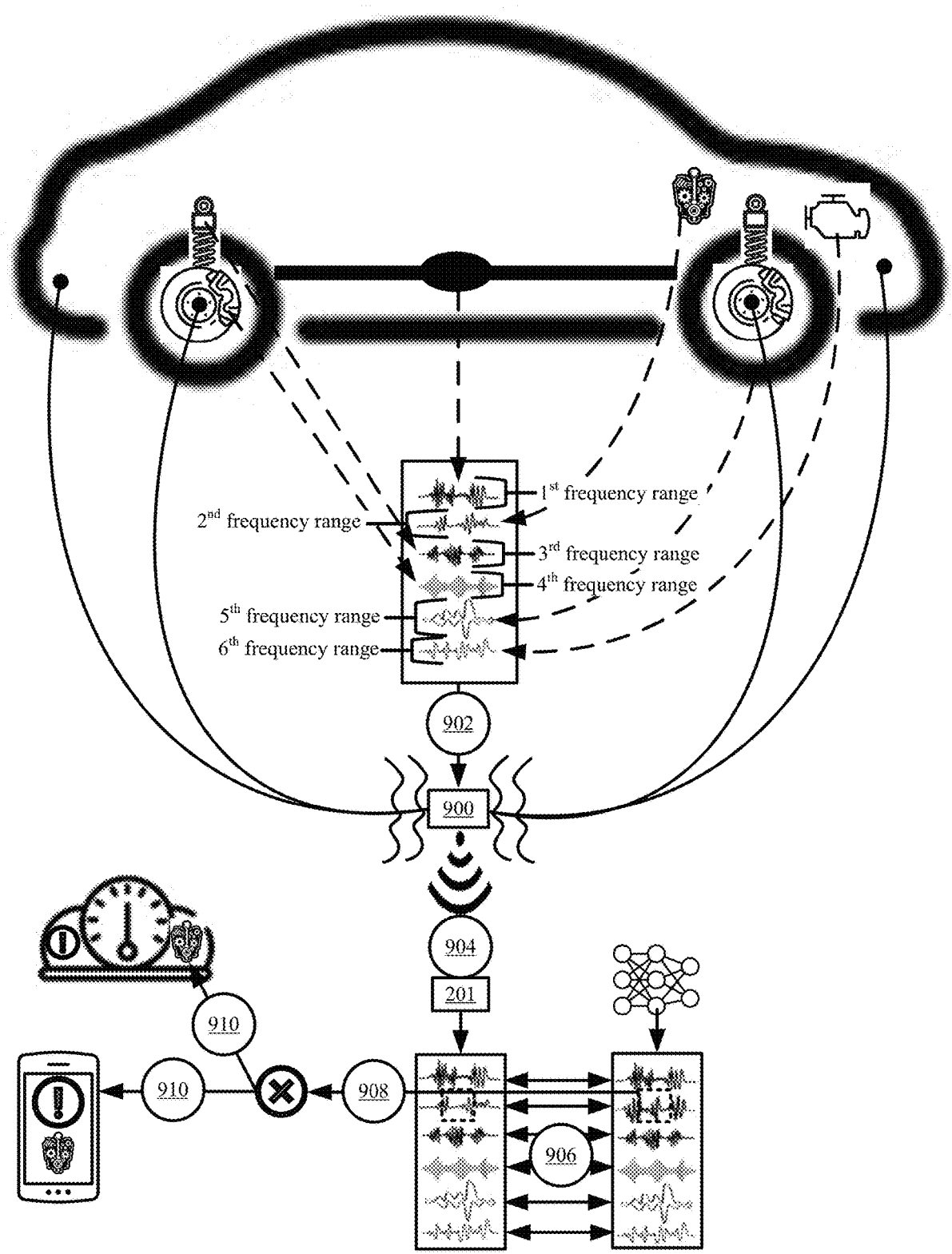
FIG. 9 illustrates an example of detecting issues with different vehicle components by monitoring and analyzing vibrations of the different vehicle components in accordance with some embodiments presented herein.

FIG. 9 illustrates an example of detecting issues with different vehicle components by monitoring and analyzing vibrations of the different vehicle components in accordance with some embodiments presented herein. As shown in FIG. 9, vibration sensors 900 are located on wheel-integrated monitoring devices 100 (e.g., on the vehicle wheels) and elsewhere on the vehicle.

Vibration sensors 900 measure (at 902) the sounds or harmonics produced by different vehicle components while the vehicle is operational. For instance, the engine generates harmonics in a first frequency range, the suspension comprised of shocks and struts generates harmonics in a second frequency range, the transmission generates harmonics in a third frequency range, the brakes generate harmonics in a fourth frequency range, the tires generate harmonics in a fifth frequency range, and other vehicle components generate harmonics in other frequency ranges.

Vibration sensors 900 wireless transmit (at 904) the measured harmonics to controller 201. Controller 201 is configured with machine-generated models for the harmonics produced by the different vehicle components at different normal and abnormal states. In particular, the machine-generated models may identify frequency patterns or characteristics associated with normal operation of each vehicle component and different frequency patterns or characteristics associated with different abnormal operations or issues associated with each vehicle component.

Controller 201 compares (at 906) the measured harmonics to the modeled harmonics. Controller 201 determines (at 908) that the measured harmonics in a second frequency range are abnormal or deviate from the modeled harmonics for normal operation of a particular vehicle component that generates harmonics in the second frequency range when operational. In some embodiments, the measured harmonics in the second frequency range may contain the frequency patterns or characteristics associated with a specific fault or issue that is modeled for that particular vehicle component. For instance, the measured harmonics in the second frequency range may match by a threshold amount to modeled harmonics for a transmission that is shifting irregularly (e.g., gears slippage, gear grinding, etc.).

In response to detecting the issue with the particular vehicle component, controller 201 generates (at 910) an alert. Controller 201 may present the alert on the vehicle console. Controller 201 may also present the alert on a user's mobile device that may be paired to the vehicle. The alert may specify the issue that is detected based on the measured harmonics. For instance, the alert may provide a warning that a critical failure has been detected on one of the vehicle tires and that the driver should immediately replace the tire or reduce speed until the vehicle can be replaced.

As shown in FIG. 9, vibration sensors 900 may be included in wheel-integrated monitoring devices 100 that are located on the tire strainer valve and/or otherwise located on the wheel or between the wheel and the tire. Vibration sensors 900 may also or alternatively be mounted to strategic points on the vehicle or vehicle chassis from which certain sounds or frequencies may be measured with less interference. For instance, vibration sensors 900 may be mounted to behind the front and rear bumpers, on the vehicle firebox, in the engine compartment, and/or to the four corners of the vehicles.

Vibration sensors 900 include devices that measure and record oscillations and/or harmonics across different frequency ranges. Vibration sensors 900 may include an array of microphones, interferometers, harmonics meters, spectrum analyzers, and/or other electrical devices for simultaneously measuring multiple sound frequencies.

In some embodiments, vibration sensors 900 may wirelessly transmit the measured harmonics to controller 201 using transceiver 109 when vibration sensors 900 are integrated as part of wheel-integrated monitoring devices 100. In some other embodiments, vibration sensors 900 may include their own wireless transceiver for communicating with controller 201.

Monitoring system 200 may train one or more neural networks to attribute sounds generated in different frequency ranges to the operation of different vehicle components and to detect specific issues associated with each vehicle component based on changing patterns or characteristics in the frequency range associated with a particular vehicle component. The neural networks may receive isolated sound samples of different vehicle components in operation and/or in different states of operation, and may generate the harmonics models for the different vehicle components in the different states. For instance, a first set of sound samples may be obtained or generated for a tire in a new state that rotates with a standard vehicle load on pavement, a second set of sound samples may be obtained or generated for the tire in a worn state that is properly aligned and balanced and that rotates with the standard vehicle load on the pavement, a third set of sound samples may be obtained or generated for the tire in the worn state that is not properly aligned or balanced and that rotates with the standard vehicle load on the pavement, a fourth set of sound samples may be obtained or generated for the tire immediately before a tire belt breaks, and a fifth set of sound samples may be obtained or generated for the tire after the tire belt breaks. The neural networks may analyze the sound samples to extract the differentiating frequency patterns or characteristics associated with each of the different states, and to generate a model that associates the differentiating frequency patterns or characteristics with each of the different states or with different issues related to the different states.

Figure 10:
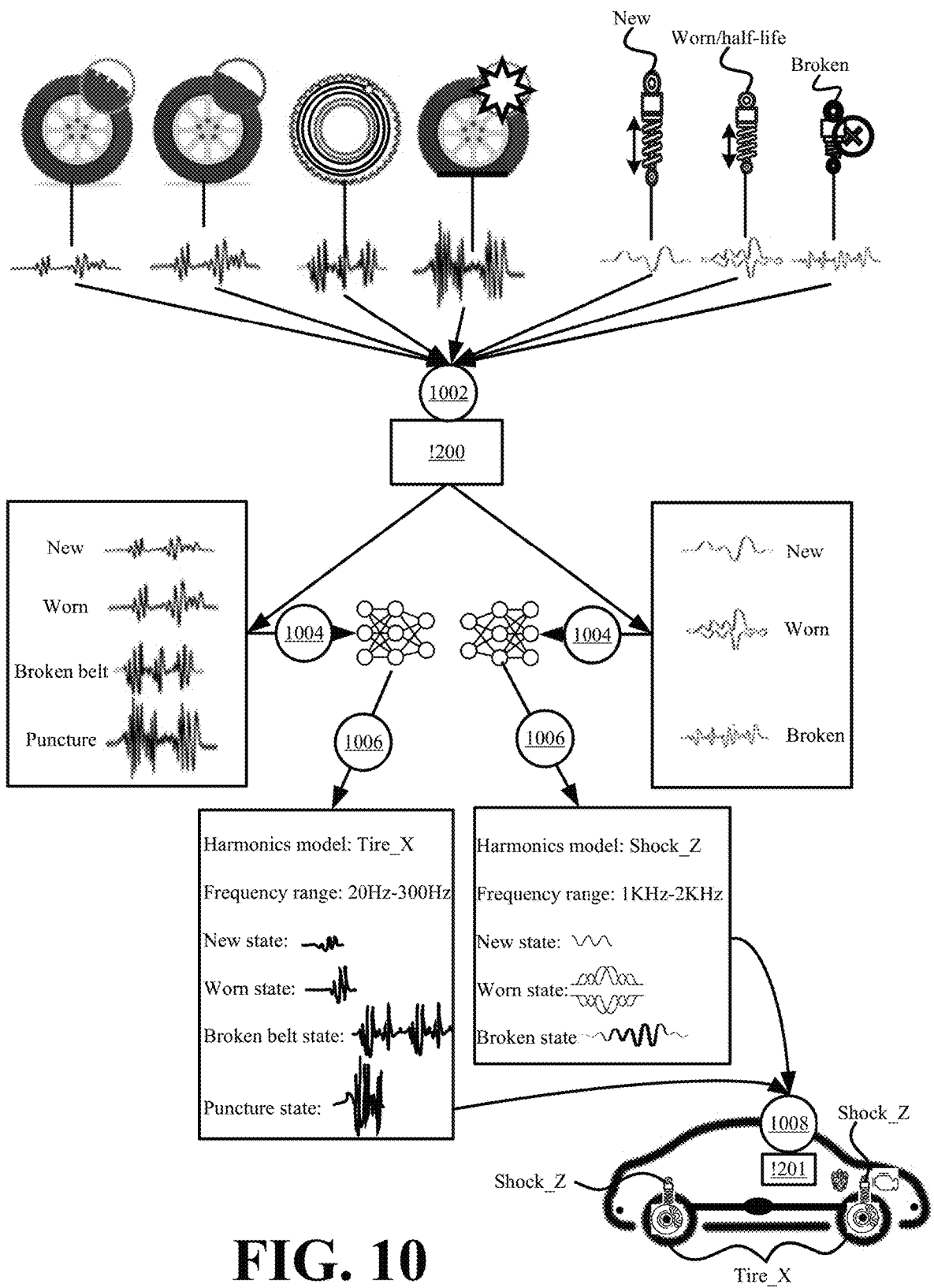
FIG. 10 illustrates an example for training a neural network to generate harmonics models that identify different frequency patterns and characteristics for different states of vehicle components in accordance with some embodiments presented herein.

FIG. 10 illustrates an example for training a neural network to generate the harmonics models that identify different frequency patterns and characteristics for different states of vehicle components in accordance with some embodiments presented herein. Training the neural network includes obtaining (at 1002) the harmonics that are generated from different vehicle components operating at different states. In some embodiments, monitoring system 200 obtains (at 1002) different samples of recorded or measured harmonics for the same component from the same manufacturer on different vehicles in order to train a harmonics model specifically for that manufacturer's component. In some other embodiments, monitoring system 200 obtains (at 1002) different samples of recorded or measured harmonics for the same component from the same manufacturer on multiple vehicles of the same make and model in order to train a harmonics model specifically based on the operation of the component on that specific vehicle make and model, thereby eliminating variation that may be introduced in the harmonics of the component by other components of different vehicles. In some other embodiments, monitoring system 200 obtains (at 1002) different samples of the recorded or measured harmonics for a particular component made by different manufacturers (e.g., struts from different manufacturers) in order to train a harmonics model based on generalized operation of the particular component.

The training data may be accumulated over time and obtained (at 1002) from different vehicles in the field. For instance, controller 201 of each vehicle may periodically transmit the harmonics measured on that vehicle to monitoring system 200 (e.g., to a monitoring device of the monitoring system 200 that is located in the cloud or that is accessible at a particular network address or Uniform Resource Locator). In some other embodiments, the training data may be downloaded from each vehicle whenever the vehicle is taken into a repair shop or other location for inspection or maintenance. For instance, a service technician may download the measured harmonics that were stored in a non-volatile memory or storage of controller 201 when the vehicle is brought into a shop using a diagnostic device and the diagnostic device may upload the recorded or measured harmonics to the monitoring device of monitoring system 200 for analysis.

In some embodiments, the measured harmonics are labeled. For instance, controller 201 may store the measured harmonics for the last driving session or some period of time (e.g., 1 day, 1 week, etc.) prior to the vehicle being brought into the shop. The service technician may diagnose the issue with the vehicle and may label the measured harmonics obtained (at 1002) from that vehicle with a label that is derived based on the diagnosis. For instance, the service technician may determine that the engine is misfiring, and may add a label to indicate that the obtained (at 1002) harmonics are associated with a misfiring engine. Monitoring system 200 may then use the labeled harmonics to determine the frequency patterns and characteristics that deviate from a normal firing engine and that uniquely identify operation of the misfiring engine. In particular, monitoring system 200 may compare the labeled harmonics for the misfiring engine to labeled harmonics for a normal firing engine to detect the frequency patterns and/or characteristics of the misfiring engine.

In some other embodiments, the training data may be generated and provided by the component or vehicle manufacturers. For instance, the harmonics of each engine may be recorded and transmitted to monitoring system 200 before the engine is placed in a vehicle. The harmonics may become the baseline harmonics for a new engine or the harmonics for normal operation of the engine. Similarly, strut, shock, tire, transmission, and/or other component manufacturers may record the harmonics for their components in isolation and/or in the new state, and may provide the recorded harmonics to monitoring system 200 as training data. Here again, the training data may be labeled to identify the vehicle component that generated the recorded harmonics and/or a state associated with the identified vehicle component (e.g., new state, normal operational state, state after 10,000 miles of operation, first disrepair state, second disrepair state, etc.).

Monitoring system 200 provides (at 1004) the training data with the associated labels as inputs for one or more neural networks. The neural networks analyze the training data for unique frequency ranges, frequency patterns, and/or frequency characteristics associated with each label. To improve the detection of the unique frequency ranges, patterns, and/or characteristics associated with each label, monitoring system 200 provides (at 1004) different samples for the harmonics generated by the same vehicle component in the same state on two or more vehicles of the same year, make, and model or different years, makes, and models.

The neural networks generate (at 1006) a harmonics model for each component based on the training data analysis. The neural network may generate (at 1006) different harmonics models for the same component made by different manufacturers or for each vehicle make, model, and year as different components may be used in different models and model years and/or different manufacturing or installation techniques may result in the same component having different harmonics in the different models and model years.

In some embodiments, the generated (at 1006) harmonics models differentiate the frequency ranges at which different vehicle components operate or generate noise when in operation and identify the vehicle component associated with that frequency range. In some embodiments, the generated (at 1006) harmonics models further differentiate the patterns and characteristics in each differentiated frequency range for different states of the identified component. For instance, the harmonics models may identify a particular frequency range that is used in identifying operation of a particular vehicle component, a first set of patterns or characteristics in the particular frequency range for normal operation of the particular vehicle component, a second set of patterns or characteristics in the particular frequency range that precede or forewarn of a first failure of the particular vehicle component, a third set of patterns or characteristics in the particular frequency range that are indicative of the first failure of the particular vehicle component, a fourth set of patterns or characteristics in the particular frequency range that are indicative of a second failure of the particular vehicle component, and a fifth set of patterns or characteristics in the particular frequency range that are indicative of a half-life of the particular vehicle component.

Monitoring system 200 configures (at 1008) controller 201 of a particular vehicle (e.g., specific make, model, and year) with the harmonics models that are generated (at 1006) for the components of that particular vehicle. In some embodiments, monitoring system 200 may wirelessly download the harmonics models to a non-volatile memory or storage of controller 201. In some other embodiments, monitoring system 200 may distribute the harmonics models to a dealer network or repair shops, and the dealer network or repair shops may configure (at 1008) controller 201 with the latest or most up to date harmonics models whenever the vehicle is brought in for inspection or service.

Figure 11:
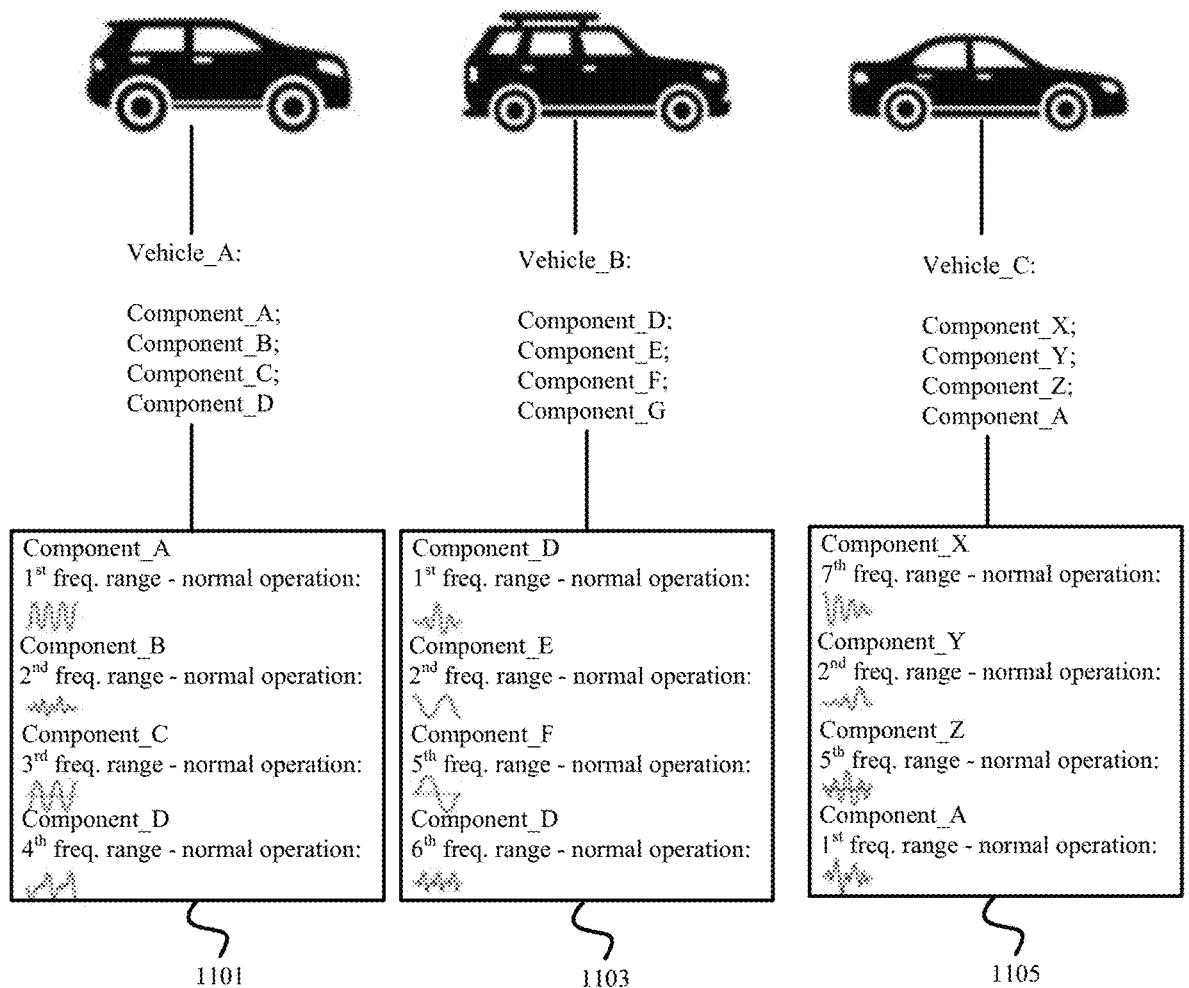
FIG. 11 illustrates an example of different harmonics models for different vehicles in accordance with some embodiments presented herein.

FIG. 11 illustrates an example of different harmonics models 1101, 1103, and 1105 for different vehicles in accordance with some embodiments presented herein. Each harmonics model 1101, 1103, and 1105 isolates and associates different frequency ranges with operational harmonics of different vehicle components. Moreover, each frequency range may have different modeled frequency patterns or characteristics that uniquely correspond to different states of the vehicle component associated with the frequency range. Accordingly, if harmonics measured by vibration sensors 900 of a vehicle have patterns and characteristics in a particular frequency range that match by a threshold amount to the modeled patterns and characteristics in the particular frequency range for a particular issue with a vehicle component, then controller 201 of the vehicle may issue an alert that identifies the particular issue.

In some embodiments, the harmonics models may be used to draw inferences or predictions as to the remaining life of a component or the likelihood of a component to fail. In particular, the neural networks may track changes between different component states by tracking changes in the frequency patterns or characteristics of each component and/or the time for these changes to occur. For instance, the life of a specific tire may be modeled by tracking frequency changes in the tire's frequency range. The harmonics produced by the tire may change to a first pattern or characteristics when half the remaining life of the tire remains, may change to a second pattern or characteristics when the tire needs to be replaced, and may change to a third pattern or characteristics ten miles before the tire suffers a catastrophic failure. The harmonics model for the tire may capture these changes and the time (e.g., average time computed from different harmonics samples obtained from different vehicles with the same tire) between these different states. Controller 201 may then provide real-time diagnostics as to the remaining life of the tire and/or preemptive notifications about an impending failure based on the modeled harmonics and the tracked changes between different states of the vehicle component in the modeled harmonics.

Figure 12:
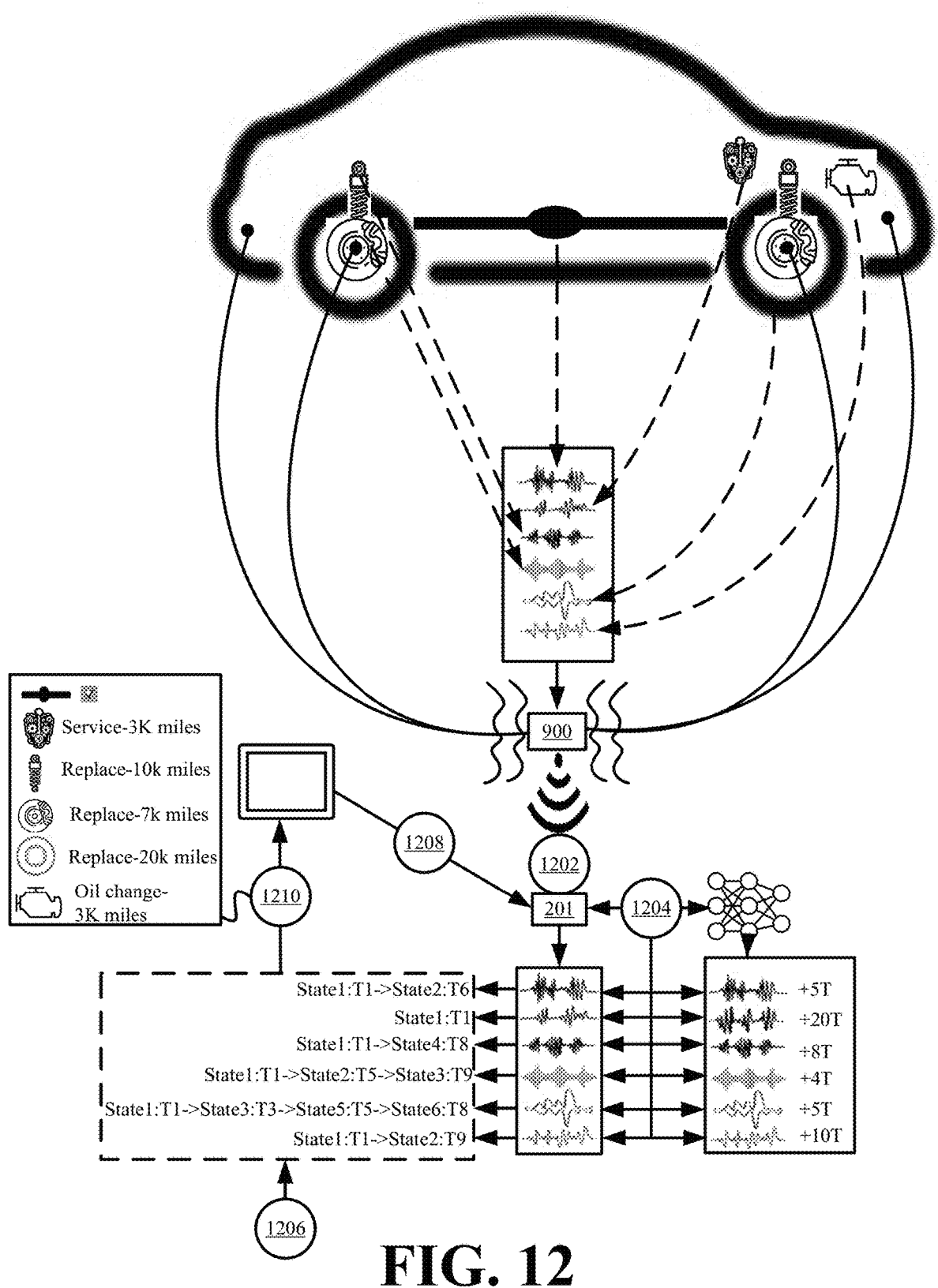
FIG. 12 illustrates an example of adapting the vibrational measurements for real-time vehicle diagnostics in accordance with some embodiments presented herein.

FIG. 12 illustrates an example of adapting the vibrational measurements for real-time vehicle diagnostics in accordance with some embodiments presented herein. Controller 201 continually receives (at 1202) vibration measurements from one or more vibration sensors 900 on a vehicle while the vehicle is moving or operational.

Controller 201 tracks the state and the rate at which the state changes for different vehicle components by comparing (at 1204) the received (at 1202) vibration measurements against the modeled frequency patterns and characteristics for different component states, by recording (at 1206) the time between each detected component state or state change, and by comparing the recorded (at 1206) times to the modeled times between state changes in the harmonics models. As shown in FIG. 12, controller 201 isolates different frequency ranges associated with axle rotation, transmission shifting, suspension operation, braking, the rotation of the tires on the road, and the running of the vehicle engine. Controller 201 tracks the state changes detected in each frequency range and determines if the state changes occur at the same rate as the state changes in the harmonics model. State changes that occur sooner than the modeled rate may be indicative of a component failing earlier than the manufacturer specified time and state changes that occur later than the modeled rate may be indication of a component having a remaining life beyond the manufactured specified life. For instance, controller 201 may determine if the axle is damaged, an amount of time before the transmission is expected to fail, an amount of time before the suspension components need to be replaced, an amount of time before the brake pads need to be replaced, an amount of time before the tire need to be replace, and a remaining life of the engine oil and/or the oil viscosity based on the tracked state changes for each component determined from the vibrational analysis.

Controller 201 receives (at 1208) a request for real-time diagnostics from a user device that wirelessly communicates with controller 201. For instance, the user device may include a tablet or smartphone device that establishes a Bluetooth connection with controller 201.

Controller 201 presents (at 1210) different values for the computed remaining life of each component. For instance, controller 201 may present (at 1210) a computed value for the remaining life of the engine oil based on the number of miles or amount of time across different tracked changes to the engine state. The computed value is a more accurate measure of the remaining life of the oil than a difference between the current mileage and the mileage for when the engine oil was last replaced. For instance, vehicle manufacturers may recommend an oil change after 10,000 miles of driving. However, a driver that drives the vehicle aggressively with rapid acceleration at high speeds and in hot climates will wear out the engine oil in fewer miles and/or in less time than a driver that drives the vehicle slowly in uncongested city roads and in cold climates. Controller 201 may also present (at 1210) another computed value for the remaining number of miles or time before the tires need to be replaced. This value may be computed based on the number of miles or amount of time across different tracked changes to the tire state and is again a more accurate measure than measuring the remaining tire tread because measuring the tire tread does not account for how fast the tire is worn, whereas the computed value is based on changing tire state over the life of the tire. For instance, a heavy 4×4 vehicle that is driven aggressively will wear tires out sooner than a light front-wheel drive sedan that is driven slowly. The vibration measurements may be used to determine how many miles or how much time has passed before the tires have reached their half-life, and may be used to accurately predict how many more miles or time is left before the tires need to be replaced.

Moreover, the tracked state changes may be used to warn users of imminent failures before they occur. For instance, controller 201 may track the state of a particular component changing to a particular state that is modeled to occur five minutes or a certain number of miles before that particular component fails. The particular component failure may increase the likelihood of the driver and passengers being injured, may cause damage to other component, or may otherwise increase the repair cost associated with the vehicle and/or the particular component.

Figure 13:
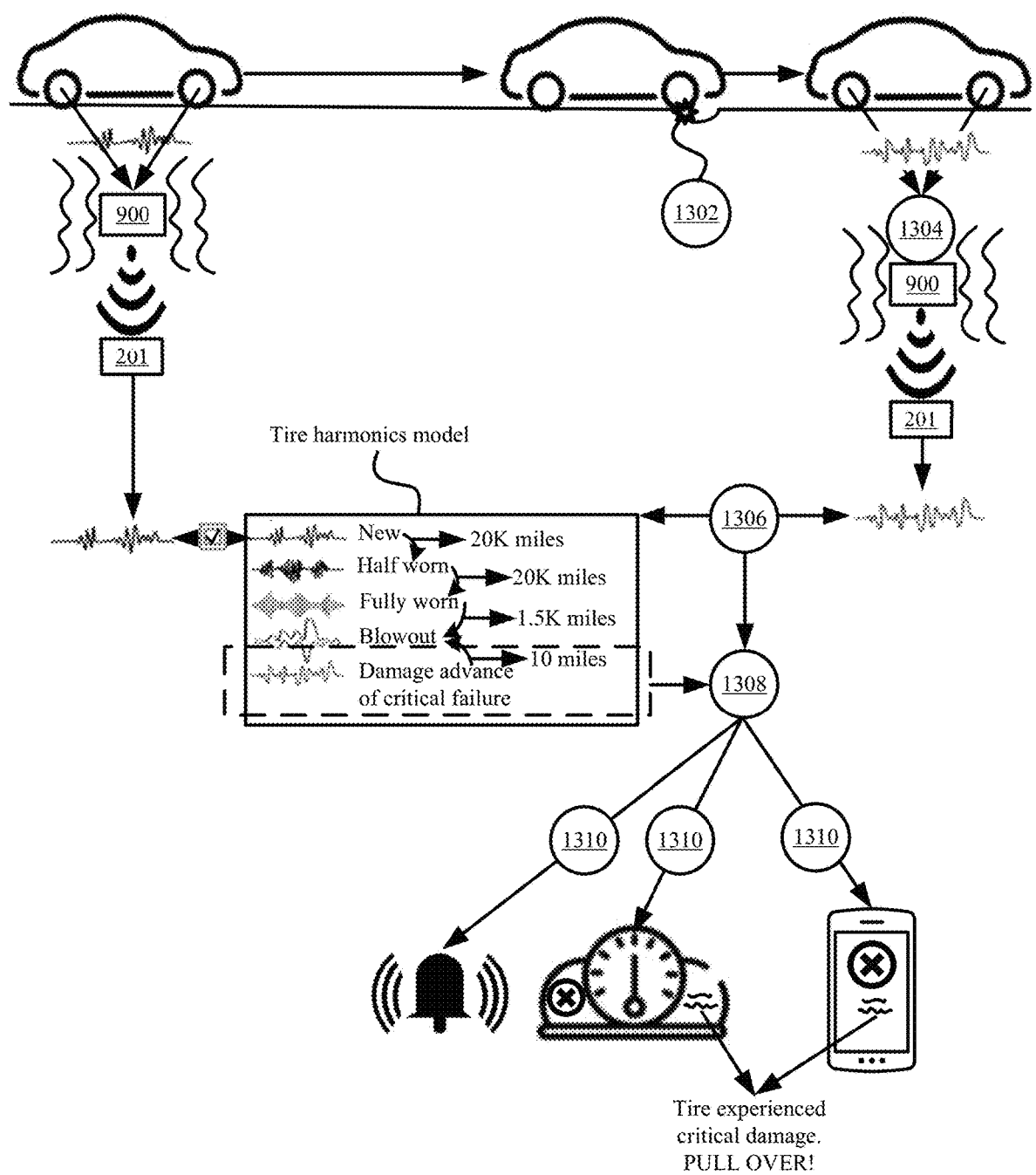
FIG. 13 illustrates an example of generating preemptive warning of an impending failure based on the vibrational modeling and tracked state changes in accordance with some embodiments presented herein.

FIG. 13 illustrates an example of generating preemptive warning of an impending failure based on the vibrational modeling and tracked state changes in accordance with some embodiments presented herein. The vehicle is driving on a road and one of the tires contacts (at 1302) an imperfection on the road. The imperfection may include a pothole, a nail, broken glass, a metal shard, a jagged rock, or some other object that is not avoided due the size or shape of the object, the vehicle speed, or other vehicles obscuring the object. The driver may be unaware that the contact was made due the tire and/or shocks absorbing most of the impact force, the contact resulting in no noticeable change to the driving characteristics of the vehicle, and/or because the road surface is rough.

Vibration sensors 900 detect (at 1304) a change in the harmonics generated by the vehicle tires that remains after the contact (at 1302). Controller 201 receives the vibrational measurements from vibration sensors 900, compares (at 1306) the patterns and/or characteristics of the changed harmonics to the harmonics models defined in the same frequency range and/or for tire operation, and determines (at 1308) that the tire has damage that imminently leads to a blowout or critical failure of the tire. For instance, controller 201 may determine that the changed harmonics match by a threshold amount to harmonics modeled for a punctured tire that was later modeled to suffer a blowout about 10 miles after the changed harmonics were first detected. In other words, there is a limited amount of time before the tire fails after which significant damage or harm may occur to the vehicle and its occupants.

Controller 201 generates (at 1310) alerts that notify the driver of the tire state. For instance, the alerts may instruct the driver to pull over immediately or to reduce speed to avoid the tire from blowing out. The alerts may also include audible alarms, flashing console lights, and/or other audio or visual notification.

In some embodiments, controller 201 may automatically adjust the driving characteristics of the vehicle in response to predicting the imminent component failure or the dangerous change in the component state. In some such embodiments, controller 201 may communicate with the vehicle's safety systems to reduce the speed at which the vehicle may be driven.

In some embodiments, the vibrational analysis may be combined with or verified based on data collected from IMU 101, accelerometer 103, gyroscope 105, and/or other sensors 107 of wheel-integrated monitoring device 100. For instance, controller 201 may detect an issue with a 60% probability and may confirm the issue based on analysis of other data obtained from wheel-integrated monitoring device 100.

Figure 14:
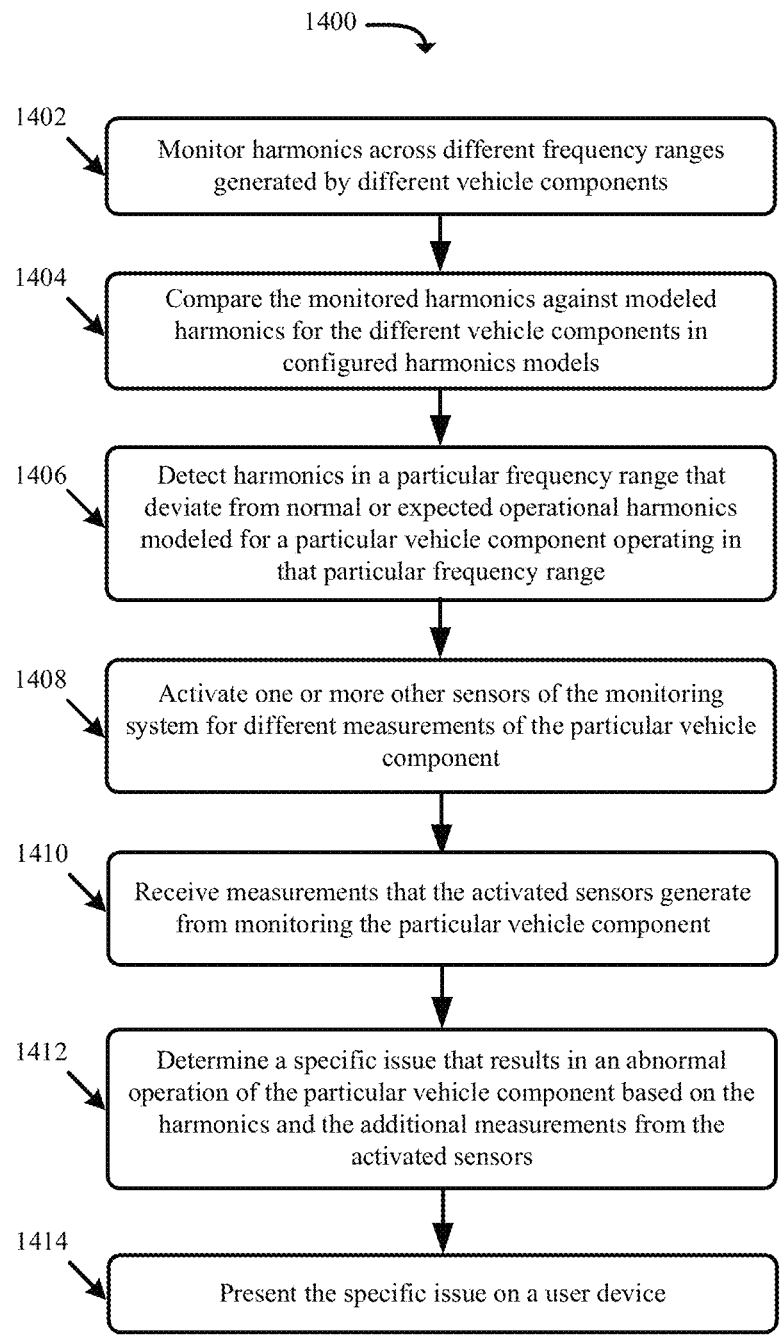
FIG. 14 presents a process for detecting issues with vehicle components based on vibration measurements and measurements from other sensors of the monitoring system in accordance with some embodiments presented herein.

FIG. 14 presents a process 1400 for detecting issues with vehicle components based on vibration measurements and measurements from other sensors of monitoring system 200 in accordance with some embodiments presented herein. Process 1400 is implemented directly on a vehicle by controller 201, vibration sensors 900, and wheel-integrated monitoring devices 100.

Process 1400 includes monitoring (at 1402) harmonics across different frequency ranges generated by different vehicle components. Monitoring (at 1402) the harmonics includes measuring or recording the sounds generated by the different vehicle components while the vehicle is operational and/or in motion. Each vibration sensor 900 may be used to monitor the operational state of two or more different vehicle components including engine state, transmission state, suspension state, tire state, and/or structural state (e.g., loss nuts and bolts, improperly fastened or installed components, chassis defects, etc.).

Process 1400 includes comparing (at 1404) the monitored (at 1402) harmonics against modeled harmonics for the different vehicle components in one or more configured harmonics models. The comparison (at 1404) may occur in real-time or continually as the harmonics are measured or may occur on a periodic or sampled basis. For instance, controller 201 may perform the comparison (at 1404) every five seconds while the vehicle is in operation.

Process 1400 includes detecting (at 1406) harmonics in a particular frequency range that deviate from normal or expected operational harmonics modeled for a particular vehicle component operating in that particular frequency range. For instance, the harmonics produced by the particular vehicle component may have a pattern and/or characteristics that deviate from a modeled normal pattern and/or characteristics for the particular vehicle component by more than a threshold amount (e.g., deviate by more than 20%). In some embodiments, the harmonics models may model only the normal or expected harmonics for each monitored vehicle component in their respective frequency ranges. In some other embodiments, the harmonics models may model the normal or expected harmonics along with the harmonics associated with other states of the monitored vehicle component.

Process 1400 includes activating (at 1408) one or more other sensors of the monitoring system and/or wheel-integrated monitoring device 100 for different measurements of the particular vehicle component. For instance, controller 201 may determine which sensors are available for targeted monitoring of the particular vehicle component, and may activate (at 1408) those sensors to provide additional monitoring of the particular vehicle component.

Process 1400 includes receiving (at 1410) measurements that the activated (at 1408) one or more sensors generate from monitoring the particular vehicle component. When the particular vehicle component is a tire, controller 201 may obtain measurements from the TPMS and/or sensors of each wheel-integrated monitoring device 100. When the particular vehicle component is the engine, controller 201 may obtain measurements from the engine thermometer, knock sensor, oxygen sensors, pressure sensors, and/or other engine sensors.

Process 1400 includes determining (at 1412) a specific issue that results in an abnormal operation of the particular vehicle component based on the harmonics and the additional measurements from the one or more sensors. In particular, controller 201 uses the data from vibration sensors 900 and other vehicle sensors to isolate the issue affecting the normal operation of the particular vehicle component.

Process 1400 includes presenting (at 1414) the specific issue on a user device. In some embodiments, the user device may establish a wireless connection to controller 201 through a pairing or other connection establishment procedure, and controller 201 may present the specific issue on the user device via the wireless connection.

Rather than present a generic check engine light or tire fault light on the vehicle console, the presentation (at 1414) of the specific issue details which vehicle component is affected and the exact fault associated with that vehicle component. Moreover, the scope of issues that the monitoring system detects and isolates far exceeds the number of issues that the array of sensors on a traditional vehicle are capable of detecting. For instance, vibration sensors 900 may be able to detect loose nuts and bolts, improperly fastened or installed vehicle components, and structural issues that traditional vehicle sensors are unable to detect and/or isolate.

Figure 15:
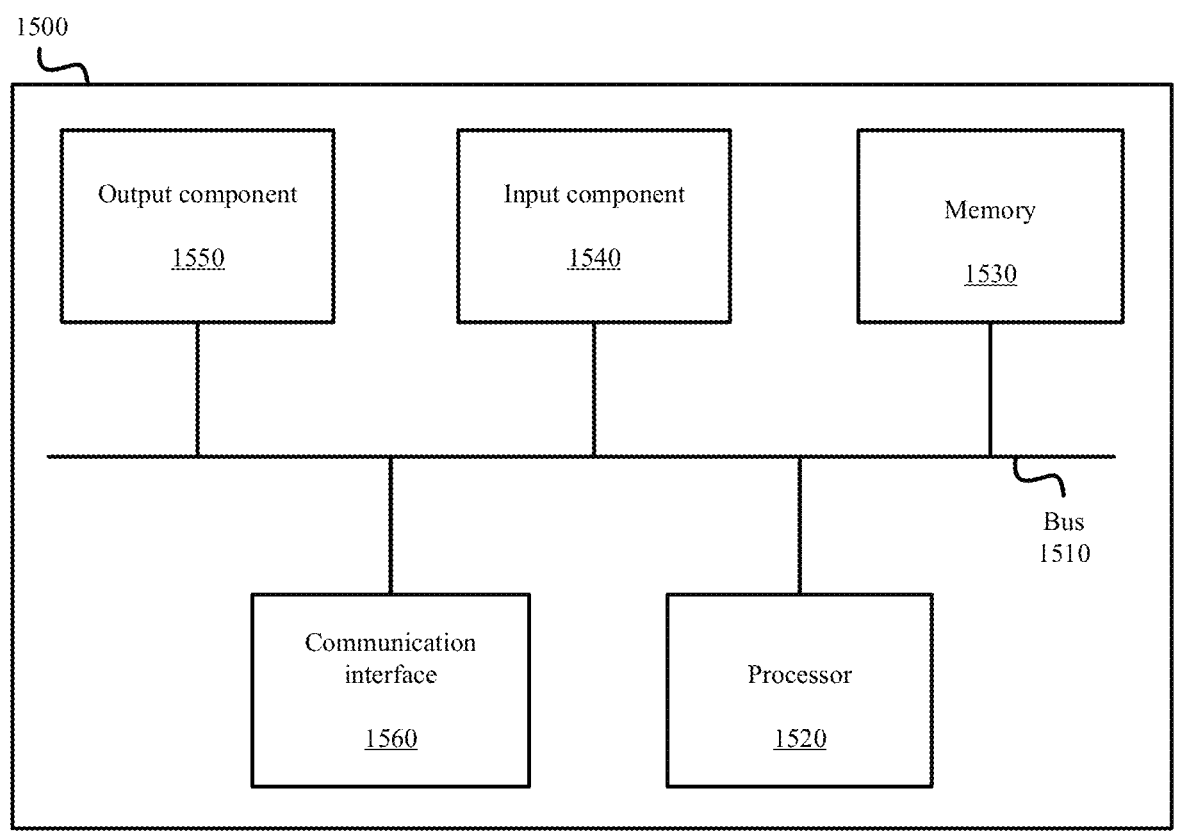
FIG. 15 illustrates example components of one or more devices, according to one or more embodiments described herein.

FIG. 15 is a diagram of example components of device 1500. Device 1500 may be used to implement one or more of the devices or systems described above (e.g., wheel-integrated monitoring device 100, controller 201, monitoring system 200, vibration sensors 900, etc.). Device 1500 may include bus 1510, processor 1520, memory 1530, input component 1540, output component 1550, and communication interface 1560. In another implementation, device 1500 may include additional, fewer, different, or differently arranged components.

Bus 1510 may include one or more communication paths that permit communication among the components of device 1500. Processor 1520 may include a processor, microprocessor, or processing logic that may interpret and execute instructions. Memory 1530 may include any type of dynamic storage device that may store information and instructions for execution by processor 1520, and/or any type of non-volatile storage device that may store information for use by processor 1520.

Input component 1540 may include a mechanism that permits an operator to input information to device 1500, such as a keyboard, a keypad, a button, a switch, etc. Output component 1550 may include a mechanism that outputs information to the operator, such as a display, a speaker, one or more light emitting diodes ("LEDs"), etc.

Communication interface 1560 may include any transceiver-like mechanism that enables device 1500 to communicate with other devices and/or systems. For example, communication interface 1560 may include an Ethernet interface, an optical interface, a coaxial interface, or the like. Communication interface 1560 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1500 may include more than one communication interface 1560. For instance, device 1500 may include an optical interface and an Ethernet interface.

Device 1500 may perform certain operations relating to one or more processes described above. Device 1500 may perform these operations in response to processor 1520 executing software instructions stored in a computer-readable medium, such as memory 1530. A computer-readable medium may be defined as a non-transitory memory device. A memory device may include space within a single physical memory device or spread across multiple physical memory devices. The software instructions may be read into memory 1530 from another computer-readable medium or from another device. The software instructions stored in memory 1530 may cause processor 1520 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

The invention claimed is:

1. A method comprising:
    measuring operational frequencies of a plurality of components of a vehicle during operation of the vehicle;
    comparing the operational frequencies to a model comprising modeled frequencies for one or more operational states of each component from the plurality of components;
    tracking a rate at which the operational frequencies in a particular frequency range associated with a specific component of the plurality of components match different frequencies that are modeled for a set of operational states that precede an abnormal operational state for the specific component in the model;
    determining a remaining time before the specific component reaches the abnormal operational state based on a difference between the rate that is tracked and a modeled rate for changing to the abnormal operational state in the model; and
    presenting the remaining time before the specific component reaches the abnormal operational state on one or more of a vehicle console or a user device.

2. The method of claim 1 further comprising:
differentiating the operational frequencies in a first frequency range to a first component of the plurality of components, and the operational frequencies in a second frequency range to a second component of the plurality of components; and
wherein comparing the operational frequencies comprises:
comparing the operational frequencies in the first frequency range to a first model comprising the modeled frequencies in the first frequency range for the one or more operational states of the first component; and
comparing the operational frequencies in the second frequency range to a second model comprising the modeled frequencies in the second frequency range for the one or more operational states of the second component.

3. The method of claim 1 further comprising:
determining that the operational frequencies in a second frequency range associated with a second component of the plurality of components correspond to a normal operational state for the second component in response to the operational frequencies in the second frequency range matching the modeled frequencies for the normal operational state of the second component, wherein the second frequency range is different than the particular frequency range and the second component is different than the specific component.

4. The method of claim 1 further comprising:
predicting a remaining life of the specific component based on the operational frequencies in the particular frequency range matching the modeled frequencies for the abnormal operational state of the specific component and the abnormal operational state being associated with a time or an amount of usage before the abnormal operational state changes to a failed operational state; and
presenting the remaining life of the specific component.

5. The method of claim 1 further comprising:
tracking the specific component changing from the abnormal operational state to a second operational state based on the operational frequencies in the particular frequency range changing to different modeled frequencies for the second operational state.

6. The method of claim 5, wherein tracking the specific component comprises:
recording a time that the specific component changes from the abnormal operational state to the second operational state in a non-volatile memory or storage.

7. The method of claim 1 further comprising:
determining a make and model of the vehicle; and
selecting the model from a plurality of models that are defined for different vehicle makes and models based on the make and model determined for the vehicle, wherein each model of the plurality of models comprises modeled frequencies for one or more operational states of different components found in a different vehicle make and model represented by that model.

8. The method of claim 1 further comprising:
detecting an issue with an engine of the vehicle in response to the operational frequencies in the particular frequency range being associated with the engine; and
detecting an issue with a tire of the vehicle in response to the operational frequencies in the particular frequency range being associated with the tire.

9. The method of claim 1 further comprising:
measuring frequencies in a first frequency range generated by an engine of the vehicle operating at different states;
modeling frequencies in a second frequency range generated by one or more suspension components of the vehicle operating at different states; and
generating the model based on unique frequency patterns or characteristics associated with each of the different states of the engine in the first frequency range and based on unique frequency patterns or characteristics associated with each of the different states of the one or more suspension components in the second frequency range.

10. The method of claim 1 further comprising:
receiving the operational frequencies at a controller located on the vehicle via a wireless transmission of the operational frequencies from one or more vibration sensors located on the vehicle.

11. The method of claim 1, wherein measuring the operational frequencies comprises:
measuring the operational frequencies that a first component of the plurality of components generates within a first frequency range as a result of first materials and a first operation of the first component; and
measuring the operational frequencies that a second component of the plurality of components generates across a second frequency range as a result of different second materials and a second operation of the second component.

12. The method of claim 1, wherein the plurality of components comprises two or more of an engine of the vehicle, a transmission of the vehicle, struts of the vehicle, shocks of the vehicle, brakes of the vehicle, and tires of the vehicle.

13. A vehicle monitoring system comprising:
one or more vibration sensors measuring operational frequencies of a plurality of components of a vehicle during operation of the vehicle; and
a controller comprising one or more hardware processors configured to:
receive the operational frequencies from the one or more vibration sensors;
compare the operational frequencies to a model comprising modeled frequencies for one or more operational states of each component from the plurality of components;
track a rate at which the operational frequencies in a particular frequency range associated with a specific component of the plurality of components match different frequencies that are modeled for a set of operational states that precede an abnormal operational state for the specific component in the model;
determine a remaining time before the specific component reaches the abnormal operational state based on a difference between the rate that is tracked and a modeled rate for changing to the abnormal operational state in the model; and
present the remaining time before the specific component reaches the abnormal operational state on one or more of a vehicle console or a user device.

14. The vehicle monitoring system of claim 13, wherein the one or more vibration sensors are located at a first set of positions about the vehicle, and wherein the controller is located at a position about the vehicle that is different than the first set of positions.

15. The vehicle monitoring system of claim 13, wherein the one or more hardware processors are further configured to:
- differentiate the operational frequencies in a first frequency range to a first component of the plurality of components, and the operational frequencies in a second frequency range to a second component of the plurality of components; and
- wherein comparing the operational frequencies comprises:
  - comparing the operational frequencies in the first frequency range to a first model comprising the modeled frequencies in the first frequency range for the one or more operational states of the first component; and
  - comparing the operational frequencies in the second frequency range to a second model comprising the modeled frequencies in the second frequency range for the one or more operational states of the second component.

16. The vehicle monitoring system of claim 13, wherein the one or more hardware processors are further configured to:
- determine that the operational frequencies in a second frequency range associated with a second component of the plurality of components correspond to a normal operational state for the second component in response to the operational frequencies in the second frequency range matching the modeled frequencies for the normal operational state of the second component, wherein the second frequency range is different than the particular frequency range and the second component is different than the specific component.

17. The vehicle monitoring system of claim 13, wherein the one or more hardware processors are further configured to:
- predict a remaining life of the specific component based on the operational frequencies in the particular frequency range matching the modeled frequencies for the abnormal operational state of the specific component and the abnormal operational state being associated with a time or an amount of usage before the abnormal operational state changes to a failed operational state; and
- present the remaining life of the specific component.

18. The vehicle monitoring system of claim 13, wherein the one or more hardware processors are further configured to:
- track the specific component changing from the abnormal operational state to a second operational state based on the operational frequencies in the particular frequency range changing to different modeled frequencies for the second operational state.

19. The vehicle monitoring system of claim 18, wherein tracking the specific component comprises:
- recording a time that the specific component changes from the abnormal operational state to the second operational state in a non-volatile memory or storage.

20. A non-transitory computer-readable medium storing program instructions that, when executed by one or more hardware processors of a vehicle monitoring system, cause the vehicle monitoring system to perform operations comprising:
- measuring operational frequencies of a plurality of components of a vehicle during operation of the vehicle;
- comparing the operational frequencies to a model comprising modeled frequencies for one or more operational states of each component from the plurality of components;
- tracking a rate at which the operational frequencies in a particular frequency range associated with a specific component of the plurality of components match different frequencies that are modeled for a set of operational states that precede an abnormal operational state for the specific component in the model;
- determining a remaining time before the specific component reaches the abnormal operational state based on a difference between the rate that is tracked and a modeled rate for changing to the abnormal operational state in the model; and
- presenting the remaining time before the specific component reaches the abnormal operational state on one or more of a vehicle console or a user device.

* * * * *